(12) United States Patent
Hirokawa

(10) Patent No.: US 12,519,397 B2
(45) Date of Patent: Jan. 6, 2026

(54) SWITCHING POWER SUPPLY APPARATUS AND ELECTRIC POWER SUPPLY SYSTEM

(71) Applicant: TDK CORPORATION, Tokyo (JP)

(72) Inventor: Masahiko Hirokawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 144 days.

(21) Appl. No.: 18/278,194

(22) PCT Filed: Mar. 8, 2021

(86) PCT No.: PCT/JP2021/008936
§ 371 (c)(1),
(2) Date: Aug. 22, 2023

(87) PCT Pub. No.: WO2022/190162
PCT Pub. Date: Sep. 15, 2022

(65) Prior Publication Data
US 2024/0146200 A1    May 2, 2024

(51) Int. Cl.
*H02M 3/335* (2006.01)
*H02M 1/00* (2006.01)

(52) U.S. Cl.
CPC ..... *H02M 3/33571* (2021.05); *H02M 1/0022* (2021.05); *H02M 1/0064* (2021.05); *H02M 3/33592* (2013.01)

(58) Field of Classification Search
CPC ........... H02M 3/33571; H02M 1/0022; H02M 1/0064; H02M 3/33592
See application file for complete search history.

(56) References Cited

U.S. PATENT DOCUMENTS

| | | | |
|---|---|---|---|
| 9,160,242 B2 * | 10/2015 | Sanuki | H02M 3/01 |
| 2015/0124490 A1 | 5/2015 | Sanuki et al. | |

FOREIGN PATENT DOCUMENTS

| | | |
|---|---|---|
| EP | 3 611 834 A1 | 2/2020 |
| JP | 2004-260928 A | 9/2004 |
| JP | 2010-148227 A | 7/2010 |
| JP | 2014-3764 A | 1/2014 |
| WO | 2018/189953 A1 | 10/2018 |

OTHER PUBLICATIONS

Jun. 1, 2021 International Search Report issued in International Patent Application No. PCT/JP2021/008936.

* cited by examiner

*Primary Examiner* — Adolf D Berhane
(74) *Attorney, Agent, or Firm* — Oliff PLC

(57) ABSTRACT

A switching power supply apparatus includes: a pair of input terminals; a pair of output terminals; a transformer; an inverter circuit including first to fourth switching devices, a first capacitor, and a changeover switch; a rectifying and smoothing circuit including a rectifying circuit with rectifying devices and a smoothing circuit with an inductor and a second capacitor; and a driver. The first and second switching devices are coupled in series between a pair of coupling lines each coupled to corresponding one of the input terminals. The third and fourth switching devices are coupled in series between the coupling lines. The first capacitor and a primary winding are coupled in series in no particular order between a first node between the first and second switching devices and a second node between the third and fourth switching devices. The changeover switch is coupled in parallel to the first capacitor.

9 Claims, 15 Drawing Sheets

COMPARATIVE EXAMPLE

| MAGNITUDE OF Vin | OPERATION STATE | S5, S6 | S1 | S2 | S3 | S4 |
|---|---|---|---|---|---|---|
| Vin≧Vth | HB OPERATION STATE | ON | SW | SW | OFF | OFF |
| Vin<Vth | FB OPERATION STATE | OFF | SW | SW | SW | SW |

FIG. 3A

EMBODIMENT

| MAGNITUDE OF Vin | OPERATION STATE | S5, S6 | S1 | S2 | S3 | S4 |
|---|---|---|---|---|---|---|
| Vin≧Vth | HB OPERATION STATE | OFF | (OFF or ON) | (ON or OFF) | SW | SW |
| Vin<Vth | FB OPERATION STATE | ON | SW | SW | SW | SW |

FIG. 3B

SWITCHING POWER SUPPLY APPARATUS AND ELECTRIC POWER SUPPLY SYSTEM

TECHNICAL FIELD

The disclosure relates to a switching power supply apparatus that performs voltage conversion using switching devices, and to an electric power supply system including such a switching power supply apparatus.

BACKGROUND ART

Various DC-DC converters have been proposed and put into practical use as an example of switching power supply apparatuses (see Patent Literature 1, for example). The DC-DC converter of this kind typically includes an inverter circuit, a power conversion transformer, and a rectifying and smoothing circuit. The inverter circuit includes a switching device.

CITATION LIST

Patent Literature

Patent Literature 1: Japanese Unexamined Patent Application Publication No. 2010-148227

SUMMARY

A switching power supply apparatus according to an example embodiment of the disclosure includes a pair of input terminals, a pair of output terminals, a transformer, an inverter circuit, a rectifying and smoothing circuit, and a driver. The pair of input terminals are configured to receive an input voltage. The pair of output terminals are configured to output an output voltage. The transformer includes a primary winding and a secondary winding. The inverter circuit is disposed between the pair of input terminals and the primary winding, and includes first to fourth switching devices, a first capacitor, and a changeover switch. The rectifying and smoothing circuit is disposed between the pair of output terminals and the secondary winding, and includes a rectifying circuit and a smoothing circuit. The rectifying circuit includes two or more rectifying devices. The smoothing circuit includes an inductor and a second capacitor. The driver is configured to perform switching driving to control respective operations of the first to fourth switching devices of the inverter circuit and configured to control an operation of the changeover switch. The first and second switching devices are coupled in series to each other between a pair of coupling lines, each of the coupling lines being coupled to corresponding one of the pair of input terminals. The third and fourth switching devices are coupled in series to each other between the pair of coupling lines. The first capacitor and the primary winding are coupled in series to each other in no particular order between a first node and a second node. The first node is a node between the first and second switching devices. The second node is a node between the third and fourth switching devices. The changeover switch is coupled in parallel to the first capacitor.

An electric power supply system according to an example embodiment of the disclosure includes a switching power supply apparatus and a power source. The switching power supply apparatus includes a pair of input terminals, a pair of output terminals, a transformer, an inverter circuit, a rectifying and smoothing circuit, and a driver. The pair of input terminals are configured to receive an input voltage. The pair of output terminals are configured to output an output voltage. The transformer includes a primary winding and a secondary winding. The inverter circuit is disposed between the pair of input terminals and the primary winding, and includes first to fourth switching devices, a first capacitor, and a changeover switch. The rectifying and smoothing circuit is disposed between the pair of output terminals and the secondary winding, and includes a rectifying circuit and a smoothing circuit. The rectifying circuit includes two or more rectifying devices. The smoothing circuit includes an inductor and a second capacitor. The driver is configured to perform switching driving to control respective operations of the first to fourth switching devices of the inverter circuit and configured to control an operation of the changeover switch. The first and second switching devices are coupled in series to each other between a pair of coupling lines, each of the coupling lines being coupled to corresponding one of the pair of input terminals. The third and fourth switching devices are coupled in series to each other between the pair of coupling lines. The first capacitor and the primary winding are coupled in series to each other in no particular order between a first node and a second node. The first node is a node between the first and second switching devices. The second node is a node between the third and fourth switching devices. The changeover switch is coupled in parallel to the first capacitor. The power source is configured to supply the input voltage to the pair of input terminals.

BRIEF DESCRIPTION OF THE DRAWINGS

FIG. 3A is a diagram illustrating an operation example of the switching power supply apparatus according to the comparative example.

FIG. 3B is a diagram illustrating an operation example of the switching power supply apparatus according to the example embodiment.

DETAILED DESCRIPTION

It is desired in general that a switching power supply apparatus such as a DC-DC converter achieve downsizing and a reduction in loss.

It is desirable to provide a switching power supply apparatus that makes it possible to achieve a reduction in loss while achieving downsizing, and to provide an electric power supply system including such a switching power supply apparatus.

A description is given in detail below of some example embodiments of the disclosure with reference to the drawings. The description is given in the following order.

1. Example Embodiment (an Example Case of Using a Center-Tap Rectifying Circuit)

2. Modification Examples

Modification Examples 1 and 2 (example cases of further providing a discharging resistor and discharging switches)

Modification Example 3 (an example case of using a bridge rectifying circuit)

Modification Examples 4 and 5 (example cases of using a synchronous rectifying circuit in the example embodiment and Modification Example 3)

3. Other Modification Examples

1. Example Embodiment

[Configuration]

Figure 1:
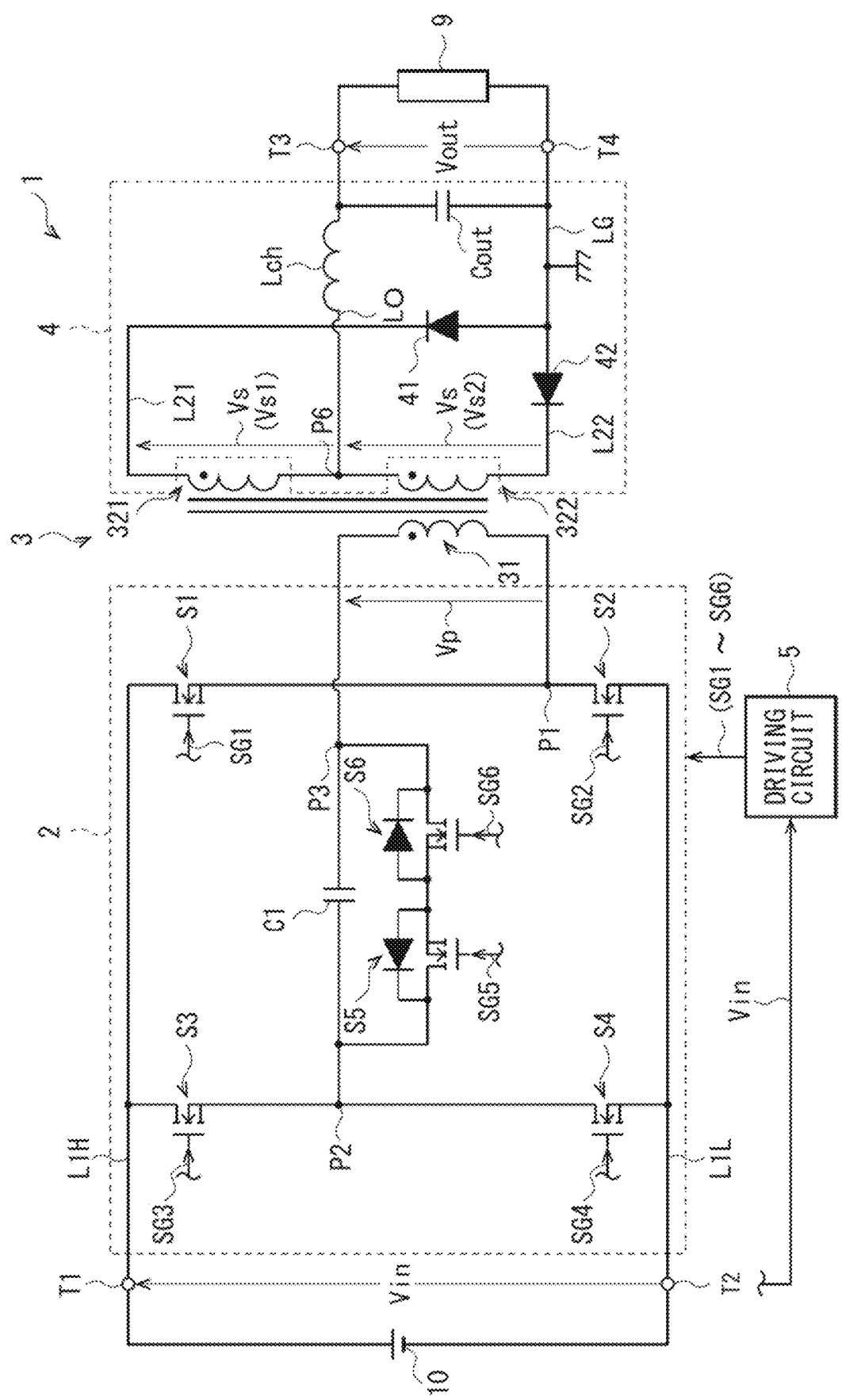
FIG. 1 is a circuit diagram illustrating a schematic configuration example of a switching power supply apparatus according to one example embodiment of the disclosure.

FIG. 1 illustrates a schematic configuration example of a switching power supply apparatus (a switching power supply apparatus 1) according to an example embodiment of the disclosure in a circuit diagram. The switching power supply apparatus 1 serves as a DC-DC converter that performs voltage conversion of a direct-current input voltage Vin supplied from a direct-current input power source 10 (e.g., a battery) into a direct-current output voltage Vout to thereby supply electric power to a load 9. Examples of the load 9 may include electronic equipment and a battery. Note that a mode of the voltage conversion to be performed by the switching power supply apparatus 1 may be either up-conversion (step-up) or down-conversion (step-down).

Here, the direct-current input voltage Vin corresponds to a specific example of an "input voltage" in one embodiment of the disclosure, and the direct-current output voltage Vout corresponds to a specific example of an "output voltage" in one embodiment of the disclosure. The direct-current input power source 10 corresponds to a specific example of a "power source" in one embodiment of the disclosure. A system including the direct-current input power source 10 and the switching power supply apparatus 1 corresponds to a specific example of an "electric power supply system" in one embodiment of the disclosure.

The switching power supply apparatus 1 includes two input terminals T1 and T2, two output terminals T3 and T4, an inverter circuit 2, a transformer 3, a rectifying and smoothing circuit 4, and a driving circuit 5. The direct-current input voltage Vin is inputted to between the input terminals T1 and T2. The direct-current output voltage Vout is outputted from between the output terminals T3 and T4.

Here, the input terminals T1 and T2 correspond to a specific example of a "pair of input terminals" in one embodiment of the disclosure. The output terminals T3 and T4 correspond to a specific example of a "pair of output terminals" in one embodiment of the disclosure.

Note that an input capacitor, for example, may be disposed between a primary high-voltage line L1H coupled to the input terminal T1 and a primary low-voltage line L1L coupled to the input terminal T2. Specifically, at a location between the inverter circuit 2 described below and the input terminals T1 and T2, a first end (one end) of the input capacitor may be coupled to the primary high-voltage line L1H and a second end (another end) of the input capacitor may be coupled to the primary low-voltage line L1L. Such an input capacitor is a capacitor for stabilizing the direct-current input voltage Vin inputted from the input terminals T1 and T2.

(Inverter Circuit 2)

The inverter circuit 2 is disposed between the input terminals T1 and T2 and a primary winding 31 of the transformer 3 to be described later. The inverter circuit 2 includes four switching devices S1 to S4, a capacitor C1, and switches S5 and S6. The inverter circuit 2 thus includes what is called a "bridge" inverter circuit. Further, although details will be described later, the inverter circuit 2 is switchable between two operation states (operation modes): an operation state where a half-bridge operation is performed; and an operation state where a full-bridge operation is performed.

Here, the primary high-voltage line L1H and the primary low-voltage line L1L described above correspond to a specific example of a "pair of coupling lines" in one embodiment of the disclosure. The switching device S1 corresponds to a specific example of a "first switching device" in one embodiment of the disclosure, and the switching device S2 corresponds to a specific example of a "second switching device" in one embodiment of the disclosure. Likewise, the switching device S3 corresponds to a specific example of a "third switching device" in one embodiment of the disclosure, and the switching device S4 corresponds to a specific example of a "fourth switching device" in one embodiment of the disclosure. Further, the switches S5 and S6 each correspond to a specific example of a "changeover switch", and also correspond to a "bidirectional switch" in one embodiment of the disclosure. In addition, the capacitor C1 corresponds to a specific example of a "first capacitor" in one embodiment of the disclosure.

As the switching devices S1 to S4, for example, switch devices such as field-effect transistors (metal oxide semiconductor-field effect transistors (MOS-FETs)) or insulated gate bipolar transistors (IGBTs) are used. In the example illustrated in FIG. 1, the switching devices S1 to S4 each include a MOS-FET. In a case where MOS-FETs are used as the switching devices S1 to S4 in this way, it is possible for a capacitor and a diode (not illustrated in FIG. 1) that are to be coupled in parallel to each of the switching devices S1 to S4 to respectively include a parasitic capacitance and a parasitic diode of corresponding one of the MOS-FETs.

In the inverter circuit 2, the two switching devices S1 and S2 are coupled in series to each other in this order between the input terminals T1 and T2, i.e., between the primary high-voltage line L1H and the primary low-voltage line L1L. Specifically, the switching device S1 is disposed between the primary high-voltage line L1H and a node P1, and the switching device S2 is disposed between the node P1 and the primary low-voltage line L1L. Likewise, the two switching devices S3 and S4 are coupled in series to each other in this order between the input terminals T1 and T2. Specifically, the switching device S3 is disposed between the primary high-voltage line L1H and a node P2, and the switching device S4 is disposed between the node P2 and the primary low-voltage line L1L.

Further, in the inverter circuit 2, the capacitor C1 and the primary winding 31 of the transformer 3 to be described later are coupled in series to each other between a node between the switching devices S1 and S2, i.e., the node P1, and a node between the switching devices S3 and S4, i.e., the node P2. Specifically, in the example of FIG. 1, a first end of the capacitor C1 is coupled to the node P2, a second end of the capacitor C1 is coupled to a node P3, one end of the primary winding 31 described above is coupled to the node P3, and another end of the primary winding 31 is coupled to the node P1.

Moreover, in the inverter circuit 2, the switches S5 and S6 coupled in series to each other are coupled in parallel to the capacitor C1. Specifically, as illustrated in FIG. 1, one end of the switch S5 is coupled to the node P2, another end of the switch S5 is coupled to one end of the switch S6, and another end of the switch S6 is coupled to the node P3. In the example of FIG. 1, these switches S5 and S6 configure a bidirectional switch including a pair of MOS-FETs, the MOS-FETs being coupled in series to each other in orientations opposite to each other. Further, although details will be described later, these switches S5 and S6 each operate as a changeover switch to be used in switching between the operation states (the half-bridge operation state and the full-bridge operation state) of the inverter circuit 2 described above.

The node P1 described above corresponds to a specific example of a "first node" in one embodiment of the disclosure, and the node P2 described above corresponds to a specific example of a "second node" in one embodiment of the disclosure.

With such a configuration, in the inverter circuit 2, the switching devices S1 to S4 perform switching operations (ON and OFF operations) in accordance with respective driving signals SG1 to SG4 supplied from the driving circuit 5 to be described later. As a result, the direct-current input voltage Vin applied to between the input terminals T1 and T2 is converted into an alternating-current voltage (a voltage Vp), and the alternating-current voltage is outputted to the transformer 3 (the primary winding 31).

(Transformer 3)

The transformer 3 includes the single primary winding 31 and two secondary windings 321 and 322.

In the primary winding 31, a first end (the one end) of the primary winding 31 is coupled to the node P3 described above, and a second end (the other end) of the primary winding 31 is coupled to the node P1 described above.

In the secondary winding 321, a first end of the secondary winding 321 is coupled to a cathode of a rectifying diode 41 to be described later via a coupling line L21 to be described later, and a second end of the secondary winding 321 is coupled to a center tap P6 in the rectifying and smoothing circuit 4 to be described later. In the secondary winding 322, a first end of the secondary winding 322 is coupled to a cathode of a rectifying diode 42 to be described later via a coupling line L22 to be described later, and a second end of the secondary winding 322 is coupled to the center tap P6 described above. In other words, the respective second ends of the secondary windings 321 and 322 are coupled commonly to the center tap P6.

The transformer 3 performs voltage conversion of a voltage generated by the inverter circuit 2, that is, the voltage Vp (see FIG. 1) in the form of a rectangular pulse wave received at the primary winding 31 of the transformer 3, and outputs an alternating-current voltage (a voltage Vs) from the respective ends of the secondary windings 321 and 322. Specifically, a voltage Vs1 is outputted from the secondary winding 321, and a voltage Vs2 is outputted from the secondary winding 322 (see FIG. 1). Note that a degree of the voltage conversion of the direct-current output voltage Vout with respect to the direct-current input voltage Vin in this case is determined as follows. That is, the degree of the voltage conversion is determined by a turns ratio between the primary winding 31 and the secondary windings 321 and 322, and a duty ratio of an ON period of each of the switching devices S1 to S4 to a switching cycle (=1/switching frequency).

(Rectifying and Smoothing Circuit 4)

The rectifying and smoothing circuit 4 includes the two rectifying diodes 41 and 42, a single choke coil Lch, and a single output smoothing capacitor Cout. Specifically, the rectifying and smoothing circuit 4 includes a rectifying circuit including the rectifying diodes 41 and 42, and a smoothing circuit including the choke coil Lch and the output smoothing capacitor Cout.

Note that such two rectifying diodes 41 and 42 correspond to a specific example of "two or more rectifying devices" in one embodiment of the disclosure. Further, the choke coil Lch corresponds to a specific example of an "inductor" in one embodiment of the disclosure, and the output smoothing capacitor Cout corresponds to a specific example of a "second capacitor" in one embodiment of the disclosure.

The rectifying circuit described above includes what is called a "center-tap" rectifying circuit. That is, respective anodes of the rectifying diodes 41 and 42 are coupled to a ground line LG, the cathode of the rectifying diode 41 is coupled to the foregoing first end of the secondary winding 321 via the coupling line L21, and the cathode of the rectifying diode 42 is coupled to the foregoing first end of the secondary winding 322 via the coupling line L22. Further, as described above, the respective second ends of the secondary windings 321 and 322 are coupled commonly to the center tap P6. The center tap P6 is coupled to the output terminal T3 described above via an output line LO and the choke coil Lch. Note that the ground line LG described above is coupled to the output terminal T4 described above.

In the smoothing circuit described above, the output smoothing capacitor Cout is coupled between the output line LO described above and the ground line LG, i.e., between the output terminals T3 and T4. That is, a first end of the output smoothing capacitor Cout is coupled to the output line LO, and a second end of the output smoothing capacitor Cout is coupled to the ground line LG.

In the rectifying and smoothing circuit 4 having such a configuration, the rectifying circuit including the rectifying diodes 41 and 42 rectifies the alternating-current voltage (the voltage Vs) outputted from the transformer 3 and outputs the rectified voltage. Further, the smoothing circuit including the choke coil Lch and the output smoothing capacitor Cout smooths the voltage rectified by the rectifying circuit described above to thereby generate the direct-current output voltage Vout. The direct-current output voltage Vout generated in this way causes electric power to be supplied to the load 9 described above from the output terminals T3 and T4.

(Driving Circuit 5)

The driving circuit 5 is a circuit that performs switching driving to control the respective operations of the switching devices S1 to S4 in the inverter circuit 2. Specifically, the driving circuit 5 controls the switching operations, i.e., the ON and OFF operations, of each of the switching devices S1 to S4 by supplying the switching devices S1 to S4 with the respective driving signals SG1 to SG4 independently of each other.

Here, the driving circuit 5 performs, for example, pulse width control in controlling the switching operations of each of the switching devices S1 to S4, that is, in performing the switching driving on each of the switching devices S1 to S4. That is, the driving circuit 5 performs pulse width modulation (PWM) control on the driving signals SG1 to SG4.

Further, the driving circuit 5 performs the above-described switching driving in such a manner that respective switching frequencies of the switching devices S1 to S4 are identical or substantially identical with each other and constant or substantially constant.

Moreover, although details will be described later, the driving circuit 5 switches between the foregoing operation states of the inverter circuit 2 by controlling the operations of the switches S5 and S6 (the changeover switches) described above, that is, by setting the switches S5 and S6 to an ON state or an OFF state in accordance with a magnitude of the direct-current input voltage Vin. That is, although details will be described later, the driving circuit 5 performs the switching driving to cause the inverter circuit 2 to change operation between the half-bridge operation and the full-bridge operation described above in accordance with a detection value of the direct-current input voltage Vin (see FIG. 1). Note that such operation control on the switches S5 and S6 is performed using driving signals SG5 and SG6 supplied independently of each other from the driving circuit 5 (see FIG. 1).

[Operations, Workings, and Effects]

(A. Basic Operation)

In the switching power supply apparatus 1, the direct-current input voltage Vin supplied from the direct-current input power source 10 via the input terminals T1 and T2 is switched at the inverter circuit 2 to generate a voltage in the form of a rectangular pulse wave, i.e., the voltage Vp. The voltage in the form of a rectangular pulse wave is supplied to the primary winding 31 of the transformer 3 and is transformed by the transformer 3. Thus, an alternating-current voltage resulting from the transformation, i.e., the voltage Vs, is outputted from the secondary windings 321 and 322.

In the rectifying and smoothing circuit 4, the alternating-current voltage outputted from the transformer 3, i.e., the alternating-current voltage resulting from the transformation described above, is rectified by the rectifying diodes 41 and 42 in the rectifying circuit, and is thereafter smoothed by the choke coil Lch and the output smoothing capacitor Cout in the smoothing circuit. The direct-current output voltage Vout is thus outputted from the output terminals T3 and T4. The direct-current output voltage Vout causes electric power to be supplied to the load 9.

(B. Detailed Operation)

Next, with reference to FIGS. 2 to 5 in addition to FIG. 1, a description will be given of detailed operations of the switching power supply apparatus 1 including operations of switching between the foregoing operation states of the inverter circuit 2 in comparison with a comparative example.

Figure 2:
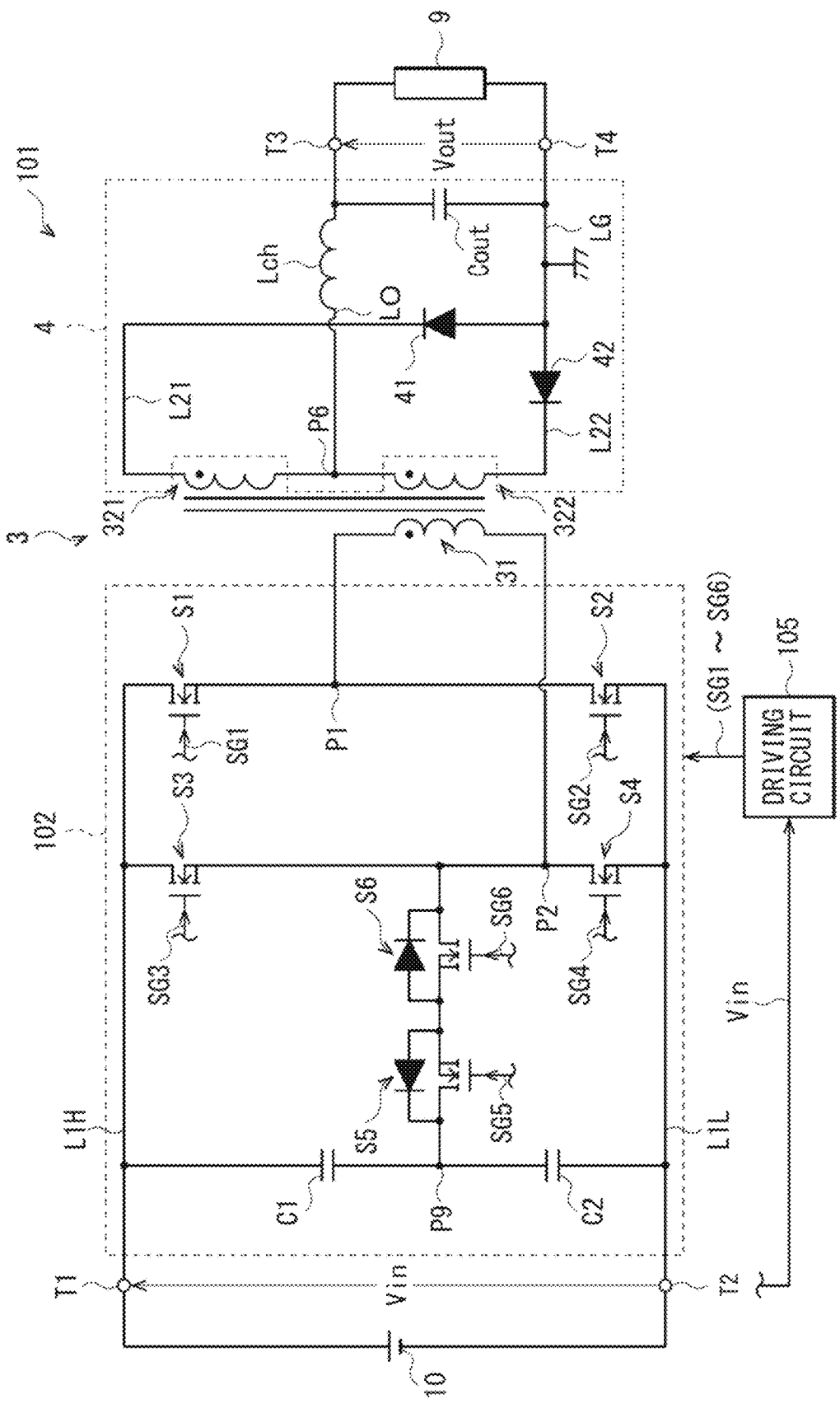
FIG. 2 is a circuit diagram illustrating a schematic configuration example of a switching power supply apparatus according to a comparative example.
Figure 4:
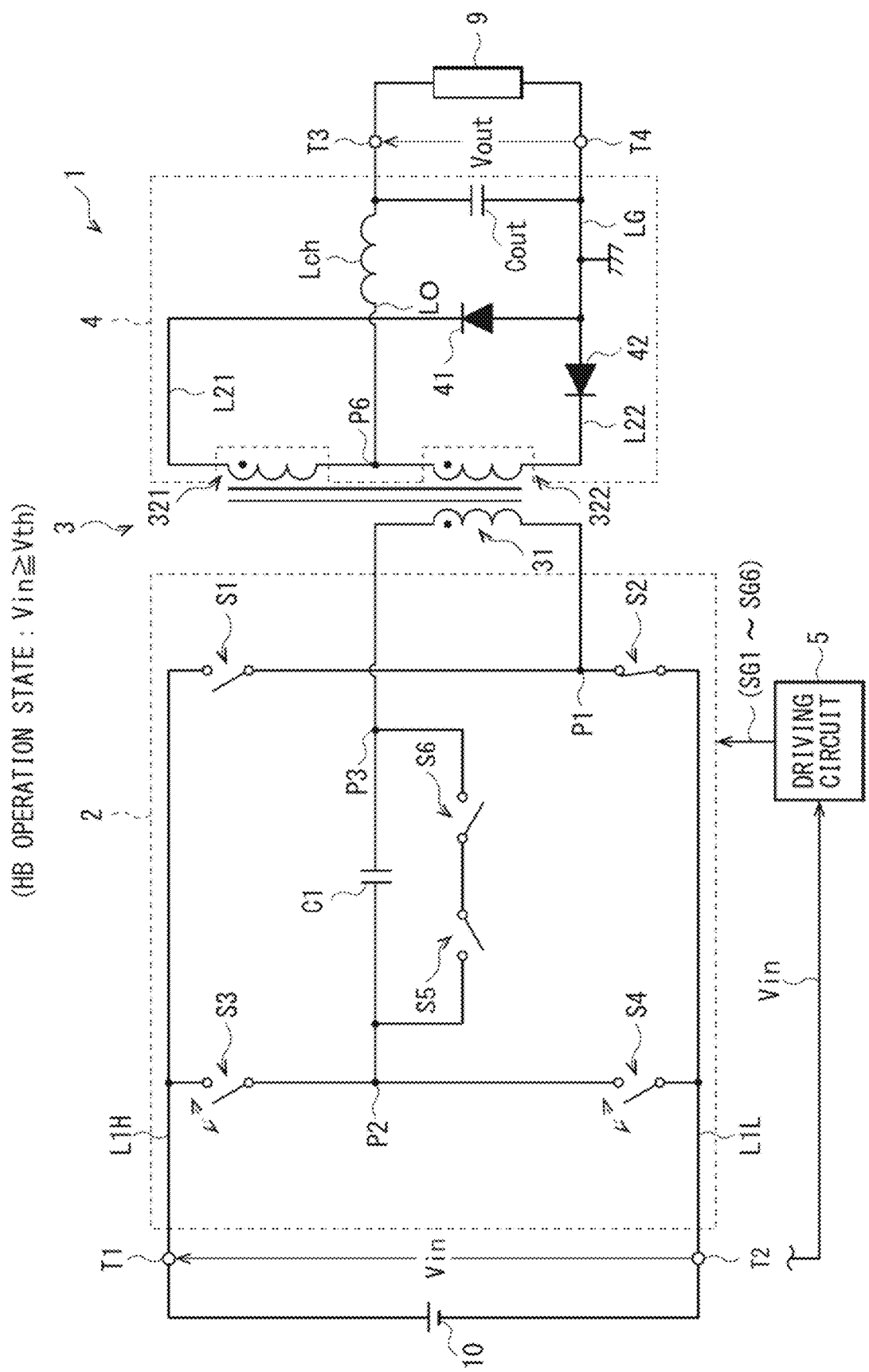
FIG. 4 is a circuit diagram schematically illustrating an operation example of the switching power supply apparatus illustrated in FIG. 1 in a half-bridge operation state.
Figure 5:
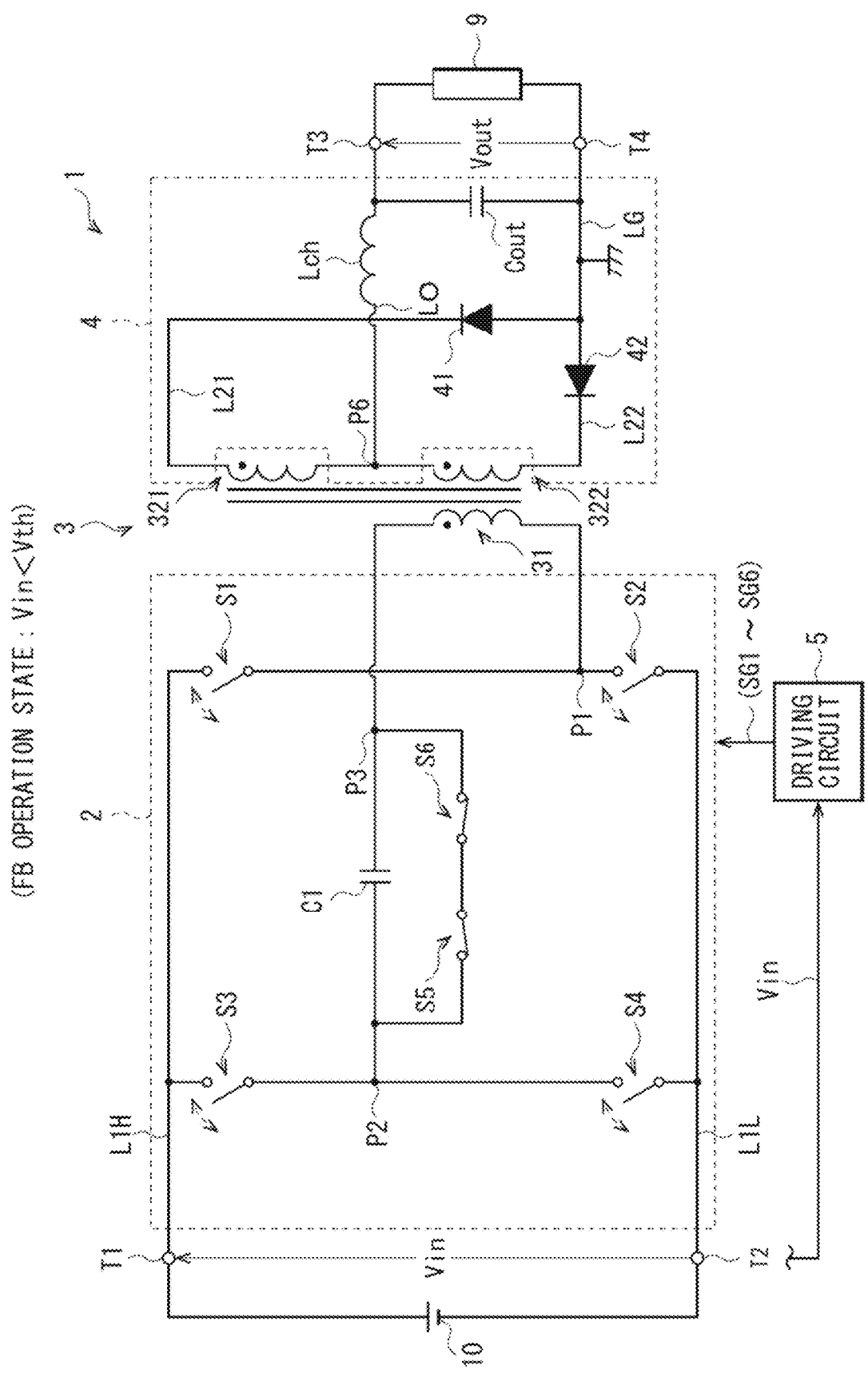
FIG. 5 is a circuit diagram schematically illustrating an operation example of the switching power supply apparatus illustrated in FIG. 1 in a full-bridge operation state.

Here, FIG. 2 illustrates a schematic configuration example of a switching power supply apparatus (a switching power supply apparatus 101) according to the comparative example in a circuit diagram. Further, part (A) of FIG. 3 illustrates an operation example of the switching power supply apparatus 101 of the comparative example, and part (B) of FIG. 3 illustrates an operation example of the switching power supply apparatus 1 of the present example embodiment. Parts (A) and (B) of FIG. 3 illustrate respective setting states of the switching devices S1 to S4 and the switches S5 and S6 in each of the foregoing operation states (the half-bridge (HB) operation state and the full-bridge (FB) operation state). FIG. 4 schematically illustrates an operation example of the switching power supply apparatus 1 of the present example embodiment in the half-bridge operation state in a circuit diagram. FIG. 5 schematically illustrates an operation example of the switching power supply apparatus 1 in the full-bridge operation state in a circuit diagram.

B-1. Comparative Example

The switching power supply apparatus 101 of the comparative example illustrated in FIG. 2 corresponds to the switching power supply apparatus 1 of the present example embodiment illustrated in FIG. 1 in which the inverter circuit 2 and the driving circuit 5 are replaced with an inverter circuit 102 and a driving circuit 105, respectively.

The inverter circuit 102 corresponds to the inverter circuit 2 of the present example embodiment (FIG. 1) with the following differences. That is, first, none of the capacitor C1 and the switches S5 and S6 described above are disposed between the nodes P1 and P2 described above. Instead, in the inverter circuit 102, the capacitor C1 is disposed between the primary high-voltage line L1H and a node P9, and a capacitor C2 is disposed between the node P9 and the primary low-voltage line L1L. In addition, the switches S5 and S6 coupled in series to each other are disposed between the node P9 and the node P2.

The driving circuit 105 is a circuit that performs switching driving to control the respective operations of the switching devices S1 to S4 in the inverter circuit 102 and also controls the respective operations of the switches S5 and S6 in the inverter circuit 102. Specifically, the driving circuit 105 controls the switching operations, i.e., the ON and OFF operations, of each of the switching devices S1 to S4 by supplying the switching devices S1 to S4 with the respective driving signals SG1 to SG4 independently of each other. Further, like the driving circuit 5 described above, the driving circuit 105 switches between the operation states of the inverter circuit 102 by controlling the operations of the switches S5 and S6, that is, by setting the switches S5 and S6 to the ON state or the OFF state in accordance with the magnitude of the direct-current input voltage Vin.

Specifically, as illustrated in part (A) of FIG. 3, the driving circuit 105 of the comparative example switches between the half-bridge (HB) operation state and the full-bridge (FB) operation state of the inverter circuit 102 in the following manner. That is, in a case where the direct-current input voltage Vin is greater than or equal to a predetermined threshold voltage Vth (Vin≥Vth), the driving circuit 105 performs switching driving to cause the inverter circuit 102 to perform the half-bridge operation, by setting each of the switches S5 and S6 (the changeover switches) to the ON state. Further, in a case where the direct-current input voltage Vin is less than the threshold voltage Vth (Vin<Vth), the driving circuit 105 performs switching driving to cause the inverter circuit 102 to perform the full-bridge operation, by setting each of the switches S5 and S6 to the OFF state. Note that an example of the threshold voltage Vth is 300 V.

More specifically, in the half-bridge operation state, the driving circuit 105 performs switching driving to cause each of the switching devices S1 and S2 to perform predetermined switching (SW) operations and to cause each of the switching devices S3 and S4 to be set to an OFF state. In contrast, in the full-bridge operation state, the driving circuit 105 performs switching driving to cause each of the switching devices S1 to S4 to perform the predetermined switching operations.

B-2. Present Example Embodiment

In contrast, as illustrated in part (B) of FIG. 3, the driving circuit 5 of the present example embodiment switches between the half-bridge (HB) operation state and the full-bridge (FB) operation state of the inverter circuit 2 in the following manner. That is, in the case where the direct-current input voltage Vin is greater than or equal to a predetermined threshold voltage Vth (Vin≥Vth), the driving circuit 5 performs switching driving to cause the inverter circuit 2 to perform the half-bridge operation, by setting each of the switches S5 and S6 (the changeover switches) to the OFF state. Further, in the case where the direct-current input voltage Vin is less than the threshold voltage Vth (Vin<Vth), the driving circuit 5 performs switching driving to cause the inverter circuit 2 to perform the full-bridge operation, by setting each of the switches S5 and S6 to the ON state. Note that an example of the threshold voltage Vth is 300 V, as with the comparative example described above.

More specifically, as illustrated in part (B) of FIG. 3 and in FIG. 4, in the half-bridge operation state, the driving circuit 5 performs switching driving to cause each of the switching devices S3 and S4 to perform predetermined switching operations (see broken-line arrows in FIG. 4), for example. Further, in the half-bridge operation state, the driving circuit 5 performs switching driving to cause the switching device S1 to be set to the OFF state and to cause the switching device S2 to be set to the ON state. Note that as illustrated in part (B) of FIG. 3, in the half-bridge operation state, the driving circuit 5 may cause the switching device S1 to be set to the ON state and cause the switching device S2 to be set to the OFF state, contrary to the above.

Further, as illustrated in part (B) of FIG. 3 and in FIG. 5, in the full-bridge operation state, the driving circuit 5 performs switching driving to cause each of the switching devices S1 to S4 to perform predetermined switching operations (see broken-line arrows in FIG. 5), for example.

Note that in the half-bridge operation state illustrated in part (B) of FIG. 3, the setting state of the switching devices S1 and S2 and the setting state of the switching devices S3 and S4 may be interchanged, that is, may be reversed from each other, for example.

(C. Workings and Effects)

Next, workings and effects of the switching power supply apparatus 1 of the present example embodiment will be described in detail in comparison with the above-described comparative example, etc.

C-1. Typical Switching Power Supply Apparatus

First, an existing typical AC-DC converter (a typical switching power supply apparatus) operates in the following manner during an output hold time upon an input shutoff (e.g., in the event of an emergency such as a power failure). That is, during such an output hold time, the AC-DC converter operates using energy (electric charge) accumulated in an input capacitor. Further, a capacitance required of the input capacitor is specified on the basis of a lower specification limit value of an input voltage and a minimum operating voltage (minimum regulation), that is, on the basis of a voltage difference between the lower specification limit value of the input voltage and the minimum operating voltage. Accordingly, for example, in a case where the lower specification limit value of the input voltage is low and the minimum operating voltage is high, that is, in a case where the voltage difference between the lower specification limit value of the input voltage and the minimum operating voltage is small, it is necessary to increase the capacitance of the input capacitor. As a result, the AC-DC converter itself as the switching power supply apparatus and an electric power supply system including the AC-DC converter can increase in size.

It is thus considered to be difficult for the typical switching power supply apparatus (AC-DC converter) to achieve downsizing.

C-2. Comparative Example

In contrast, in the switching power supply apparatus 101 of the foregoing comparative example, the operations of the switches S5 and S6 are controlled in accordance with the magnitude of the direct-current input voltage Vin to thereby cause the inverter circuit 102 to change operation state between the half-bridge operation state and the full-bridge operation state. That is, as described above, the driving circuit 105 performs switching to cause the inverter circuit 102 to be in the half-bridge operation state in the case where the direct-current input voltage Vin is relatively high (Vin≥Vth), and to be in the full-bridge operation state in the case where the direct-current input voltage Vin is relatively low (Vin<Vth).

Accordingly, as compared with the typical switching power supply apparatus described above, the foregoing comparative example makes it possible to widen an input voltage range (the range of the direct-current input voltage Vin) and to set the minimum operating voltage to a low value, thus making it possible to reduce the capacitance of each of the capacitors C1 and C2 (the input capacitors). As a result, the comparative example allows downsizing of each of the switching power supply apparatus 101 itself and an electric power supply system including the switching power supply apparatus 101.

However, according to the comparative example, in the case where the direct-current input voltage Vin is relatively high (Vin≥Vth), the switches S5 and S6 (the changeover switches) are set to the ON state to thereby cause the inverter circuit 102 to be in the half-bridge operation state, as indicated with a broken-line circle in part (A) of FIG. 3. Thus, conduction losses at the switches S5 and S6 occur within the operating input voltage range of the switching power supply apparatus 101, which means that such conduction losses occur constantly during normal operation. Accordingly, the switching power supply apparatus 101 of the comparative example can suffer increasing losses, which can make it difficult to achieve a reduction in loss.

C-3. Present Example Embodiment

In contrast, the switching power supply apparatus 1 of the present example embodiment provides, for example, the following workings and effects as compared with the foregoing comparative example, etc.

First, according to the present example embodiment, the inverter circuit 2 having the foregoing circuit configuration makes it possible to easily switch between the operation states of the inverter circuit 2 in accordance with the magnitude of the direct-current input voltage Vn, as with the foregoing comparative example.

Specifically, in the present example embodiment, the driving circuit 5 sets the inverter circuit 2 to the half-bridge operation state in the case where the direct-current input voltage Vin is greater than or equal to the predetermined threshold voltage Vth, and to the full-bridge operation state in the case where the direct-current input voltage Vin is less than the predetermined threshold voltage Vth.

Like the foregoing comparative example, the present example embodiment thereby makes it possible to widen the input voltage range (the range of the direct-current input voltage Vin) and to set the minimum operating voltage to a low value, thus making it possible to reduce the capacitance of the capacitor C1 (the input capacitor), as compared with the typical switching power supply apparatus described above.

Further, according to the present example embodiment, for example, the switches S5 and S6 are each set as follows in switching to the half-bridge operation state and in switching to the full-bridge operation state. This makes it possible to suppress the occurrence of the conduction losses described above, as compared with the foregoing comparative example.

Specifically, according to the present example embodiment, in the case where the direct-current input voltage Vin is relatively high (Vin≥Vth), the switches S5 and S6 (the changeover switches) are set to the OFF state, contrary to the foregoing comparative example, to thereby switch to the half-bridge operation state (see a broken-line arrow P10 in part (B) of FIG. 3). Further, in the case where the direct-current input voltage Vin is relatively low (Vin<Vth), the switches S5 and S6 are set to the ON state, contrary to the foregoing comparative example, to thereby switch to the full-bridge operation state (see the broken-line arrow P10 in part (B) of FIG. 3).

That is, in the present example embodiment, unlike in the foregoing comparative example, no conduction loss at the switch S5 or S6 occurs within the operating input voltage range of the switching power supply apparatus 1, which means that the occurrence of such a conduction loss is avoided during normal operation. In the present example embodiment, although conduction losses at the switches S5 and S6 occur during the output hold time upon an input shutoff (e.g., in the event of an emergency such as a power failure), such an output hold time is very short, that is, occurs only infrequently. Thus, according to the present example embodiment, the conduction losses at the switches S5 and S6 are reduced and as a result, losses in the switching power supply apparatus 1 are reduced, as compared with the foregoing comparative example.

By virtue of the foregoing, the present example embodiment makes it possible for the switching power supply apparatus 1 itself and the electric power supply system including the switching power supply apparatus 1 to achieve a reduction in loss while achieving downsizing, as compared with the foregoing comparative example, etc.

Further, in the present example embodiment, the switches S5 and S6 as the changeover switches configure the bidirectional switch including a pair of MOS-FETs, the MOS-FETs being coupled in series to each other in orientations opposite to each other. As a result, it becomes possible to easily perform operation control on such changeover switches by using gate voltages (the driving signals SG5 and SG6) to be applied to the MOS-FETs.

Moreover, in the present example embodiment, the switching devices S1 to S4 in the inverter circuit 2 each include a MOS-FET. This makes it possible to raise the switching frequency described above, thus making it possible to achieve a reduction in component size.

In addition, in the present example embodiment, the rectifying circuit in the rectifying and smoothing circuit 4 includes what is called the "center-tap" rectifying circuit. Accordingly, for example, as compared with Modification Example 1 to be described later, the number of the rectifying devices is reduced to two (the rectifying diodes 41 and 42), and consequently, it is possible to achieve reductions in size, loss, and cost of the rectifying circuit.

2. Modification Examples

Next, a description will be given of modification examples (Modification Examples 1 to 5) of the foregoing example embodiment. Note that in the following, the same reference signs are assigned to components the same as those in the example embodiment, and descriptions thereof are omitted as appropriate.

Modification Example 1

(Configuration)

Figure 6:
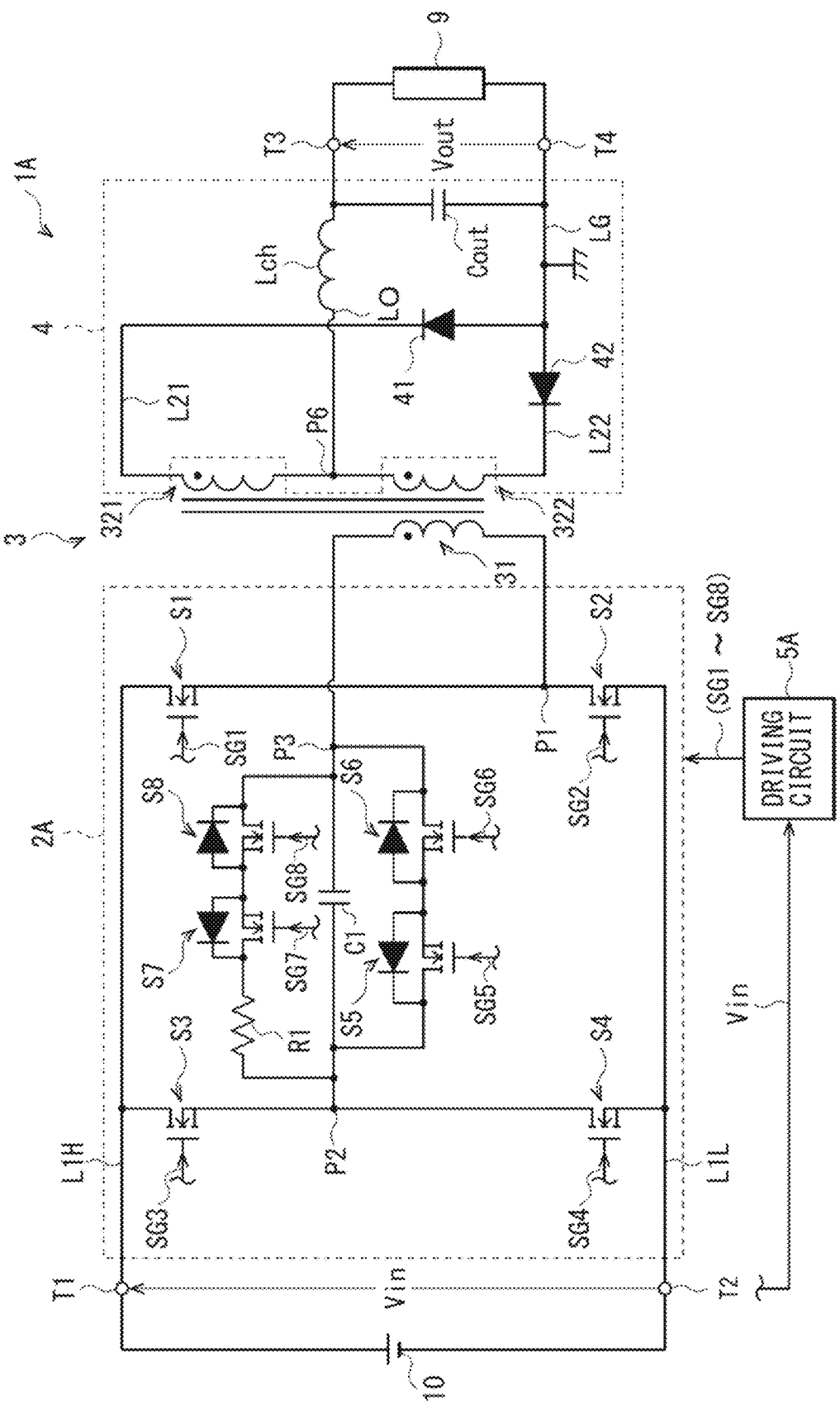
FIG. 6 is a circuit diagram illustrating a schematic configuration example of a switching power supply apparatus according to Modification Example 1.

FIG. 6 illustrates a schematic configuration example of a switching power supply apparatus (a switching power supply apparatus 1A) according to Modification Example 1 in a circuit diagram.

Note that, as with the example embodiment, a system including the direct-current input power source 10 and the switching power supply apparatus 1A corresponds to a specific example of the "electric power supply system" in one embodiment of the disclosure.

The switching power supply apparatus 1A of Modification Example 1 corresponds to the switching power supply apparatus 1 of the example embodiment in which the inverter circuit 2 and the driving circuit 5 are replaced with an inverter circuit 2A and a driving circuit 5A, respectively, with the remainder of configuration being unchanged.

The inverter circuit 2A corresponds to the inverter circuit 2, and is further provided with devices for discharging (a resistor R1 and switches S7 and S8) to be described later, with the remainder of configuration being unchanged. The resistor R1 and the switches S7 and S8 are each coupled in parallel to the capacitor C1 (and the switches S5 and S6). Specifically, as illustrated in FIG. 6, one end of the resistor R1 is coupled to the node P2, another end of the resistor R1 is coupled to one end of the switch S7, another end of the switch S7 is coupled to one end of the switch S8, and another end of the switch S8 is coupled to the node P3. Further, in the example of FIG. 6, the switches S7 and S8 configure a bidirectional switch including a pair of MOS-FETs, the MOS-FETs being coupled in series to each other in orientations opposite to each other, like the switches S5 and S6 described above.

The resistor R1 corresponds to a specific example of a "discharging resistor" in one embodiment of the disclosure. The switches S7 and S8 each correspond to a specific example of a "discharging switch" in one embodiment of the disclosure.

The driving circuit 5A is a circuit that performs operations basically similar to those of the driving circuit 5. However, the driving circuit 5A controls operations of each of the switches S7 and S8 (the discharging switches) described above, that is, sets the switches S7 and S8 to an ON state or an OFF state, in addition to performing operation control on each of the switching devices S1 to S4 and each of the switches S5 and S6. Note that such operation control on the switches S7 and S8 is performed using driving signals SG7 and SG8 supplied independently of each other from the driving circuit 5A (see FIG. 6).

Specifically, in switching the operation state of the inverter circuit 2A from the half-bridge operation state (the switches S5 and S6: OFF state) described above to the full-bridge operation state (the switches S5 and S6: ON state), the driving circuit 5A controls the operations of the switches S7 and S8, etc. in the following manner, for example.

Figure 7:
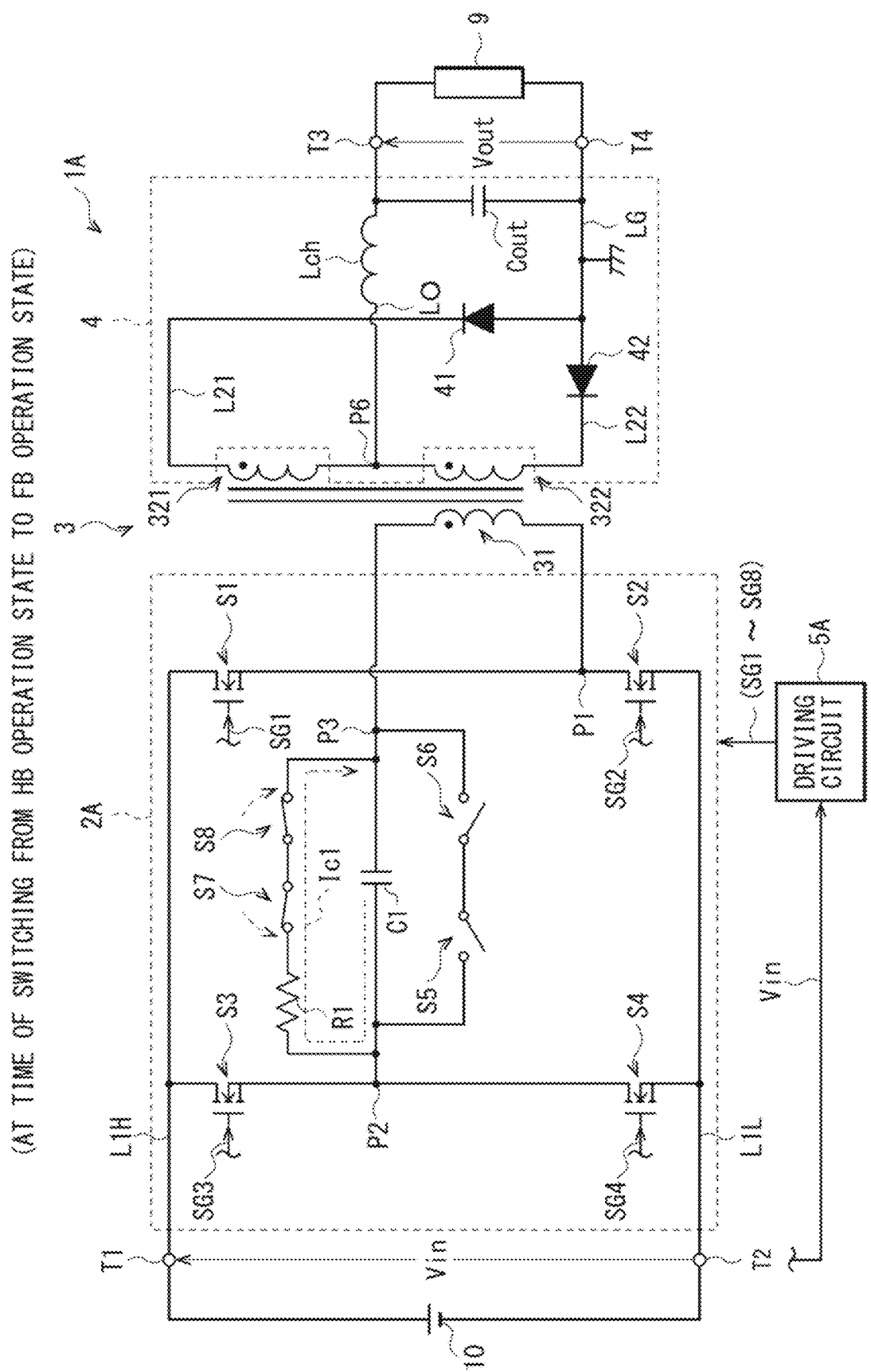
FIG. 7 is a circuit diagram schematically illustrating an operation example at the time of switching an operation state of an inverter circuit illustrated in FIG. 6.
Figure 8:
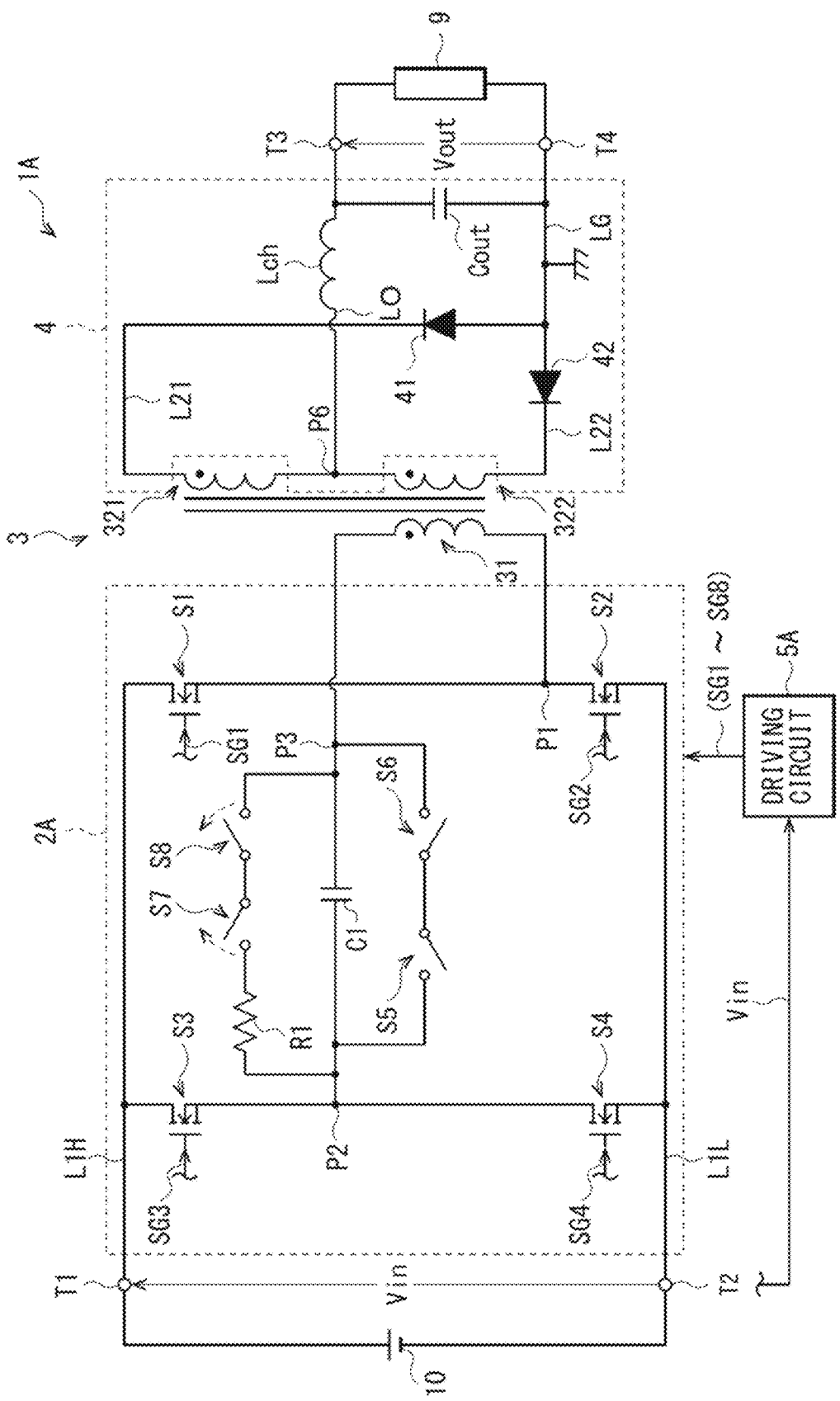
FIG. 8 is a circuit diagram schematically illustrating an operation example that follows FIG. 7.
Figure 9:
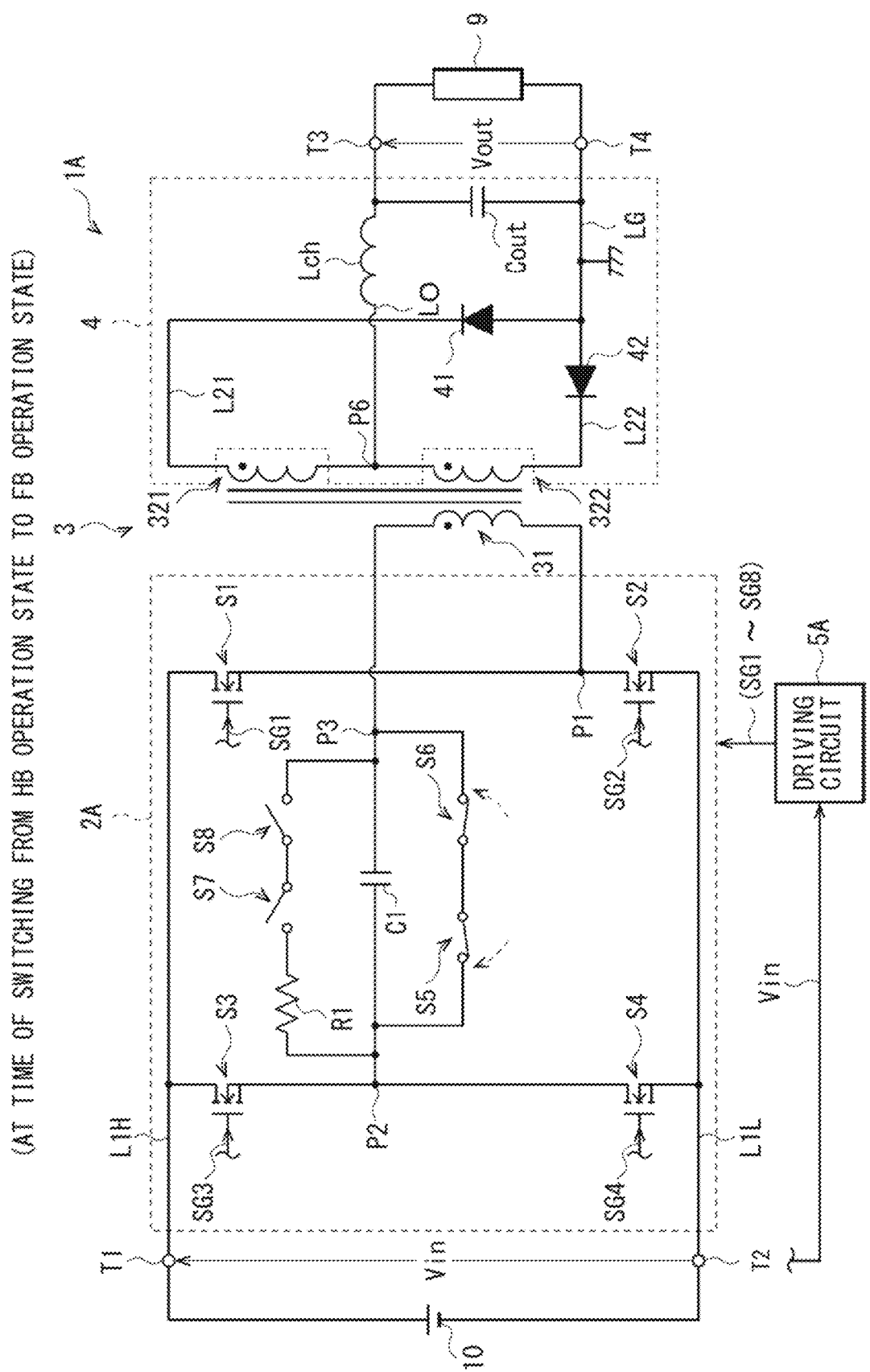
FIG. 9 is a circuit diagram schematically illustrating an operation example that follows FIG. 8.

Here, FIGS. 7 to 9 each schematically illustrate an operation example (an operation example of each of the switches S5 to S8, etc.) at the time of switching the operation state of the inverter circuit 2A in a circuit diagram.

In performing such switching from the half-bridge operation state to the full-bridge operation state, the driving circuit 5A first performs operation control on each of the switches S5 to S8 in a manner illustrated in FIG. 7, for example. That is, the driving circuit 5A switches each of the switches S7 and S8 from the OFF state to the ON state (see broken-line arrows in FIG. 7) to thereby cause electric charge accumulated in the capacitor C1 to be discharged via the resistor R1 and each of the switches S7 and S8 (see a discharge current Ic1 illustrated in FIG. 7). Note that at this time, the switches S5 and S6 each remain set to the OFF state as in the half-bridge operation state.

Next, as illustrated in FIGS. 8 and 9, for example, after the electric charge accumulated in the capacitor C1 is discharged, the driving circuit 5A switches each of the switches S5 and S6 from the OFF state to the ON state (see broken-line arrows in FIG. 9). Thus, the operation state of the inverter circuit 2A is switched to the full-bridge operation state after the discharging of the electric charge accumulated in the capacitor C1 described above.

Note that in this example, the switches S7 and S8 each return to the OFF state from the ON state (see broken-line arrows in FIG. 8) and thereafter the switches S5 and S6 are each switched from the OFF state to the ON state; however, this is non-limiting. That is, for example, contrary to the above, the switches S7 and S8 may each be returned to the OFF state from the ON state after the switches S5 and S6 are each switched from the OFF state to the ON state. It may be preferable to perform switching in such an order. However, as in the above-described example, the switches S5 and S6 may be switched from the OFF state to the ON state after the switches S7 and S8 return to the OFF state from the ON state, as long as the switching of the switches S5 and S6 immediately follows the returning of the switches S7 and S8.

(Workings and Effects)

Basically, the switching power supply apparatus 1A of Modification Example 1 having such a configuration is also able to provide effects similar to those of the switching power supply apparatus 1 of the example embodiment, through similar workings.

Further, in Modification Example 1, in particular, the devices for discharging (the resistor R1 and the switches S7 and S8) that are coupled in series to each other are coupled in parallel to the capacitor C1 in the inverter circuit 2A. This makes it possible to easily perform discharging of the electric charge accumulated in the capacitor C1 described above through the use of these devices.

Moreover, in Modification Example 1, after the switches S7 and S8 are each set to the ON state and thereby the electric charge accumulated in the capacitor C1 is discharged via the resistor R1, the switches S5 and S6 are each switched from the OFF state to the ON state. This makes it possible to avoid an adverse effect on each of the switches S5 and S6, etc., such as an increase in conduction loss at each of the switches S5 and S6, resulting from discharging of the electric charge accumulated in the capacitor C1.

Modification Example 2

(Configuration)

Figure 10:
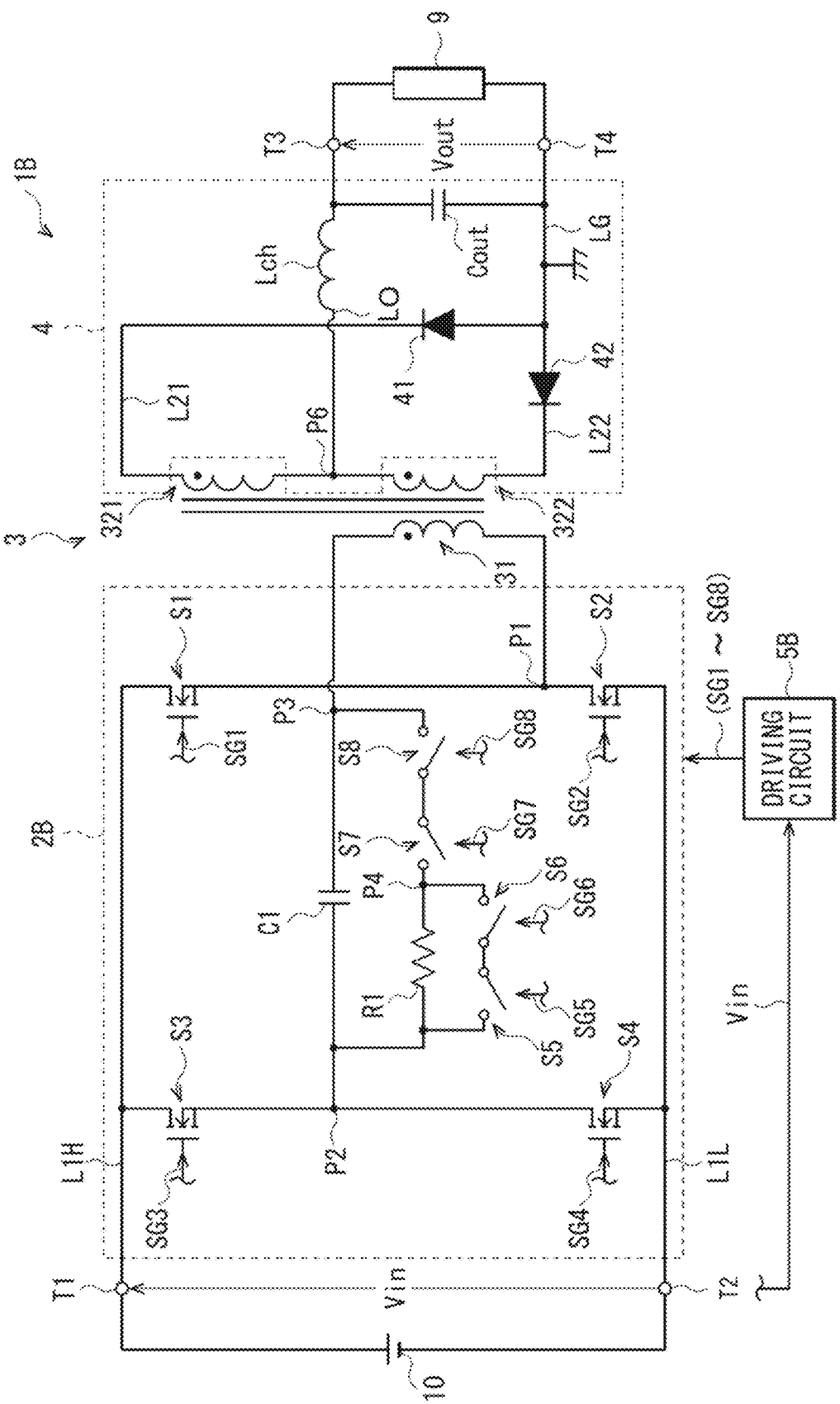
FIG. 10 is a circuit diagram illustrating a schematic configuration example of a switching power supply apparatus according to Modification Example 2.

FIG. 10 illustrates a schematic configuration example of a switching power supply apparatus (a switching power supply apparatus 1B) according to Modification Example 2 in a circuit diagram. Note that in FIG. 10, for convenience of illustration, the foregoing switches S5 to S8 are each simply illustrated in the shape of a switch.

Further, as with the example embodiment, a system including the direct-current input power source 10 and the switching power supply apparatus 1B corresponds to a specific example of the "electric power supply system" in one embodiment of the disclosure.

The switching power supply apparatus 1B of Modification Example 2 corresponds to the switching power supply apparatus 1A of Modification Example 1 in which the inverter circuit 2A and the driving circuit 5A are replaced with an inverter circuit 2B and a driving circuit 5B, respectively, with the remainder of configuration being unchanged.

The inverter circuit 2B corresponds to the inverter circuit 2A in which the positions where the switches S5 and S6 as the changeover switches are disposed are each changed, with the remainder of configuration being unchanged. Specifically, as illustrated in FIG. 10, the inverter circuit 2B has the following configuration, unlike the inverter circuits 2 and 2A. That is, the switches S5 and S6 are each coupled in parallel to the resistor R1, among the resistor R1 and the switches S7 and S8 that are coupled in series to each other. More specifically, as illustrated in FIG. 10, the one end of the switch S5 is coupled to the node P2, the other end of the switch S5 is coupled to the one end of the switch S6, and the other end of the switch S6 is coupled to a node P4. The node P4 is a node between the other end of the resistor R1 and the one end of the switch S7.

The driving circuit 5B is a circuit that performs operations basically similar to those of the driving circuit 5A. However, in switching the operation state of the inverter circuit 2B from the half-bridge operation state (the switches S5 and S6: OFF state) described above to the full-bridge operation state (the switches S5 and S6: ON state), the driving circuit 5B controls the operations of the switches S7 and S8, etc. in the following manner, for example.

Figure 11:
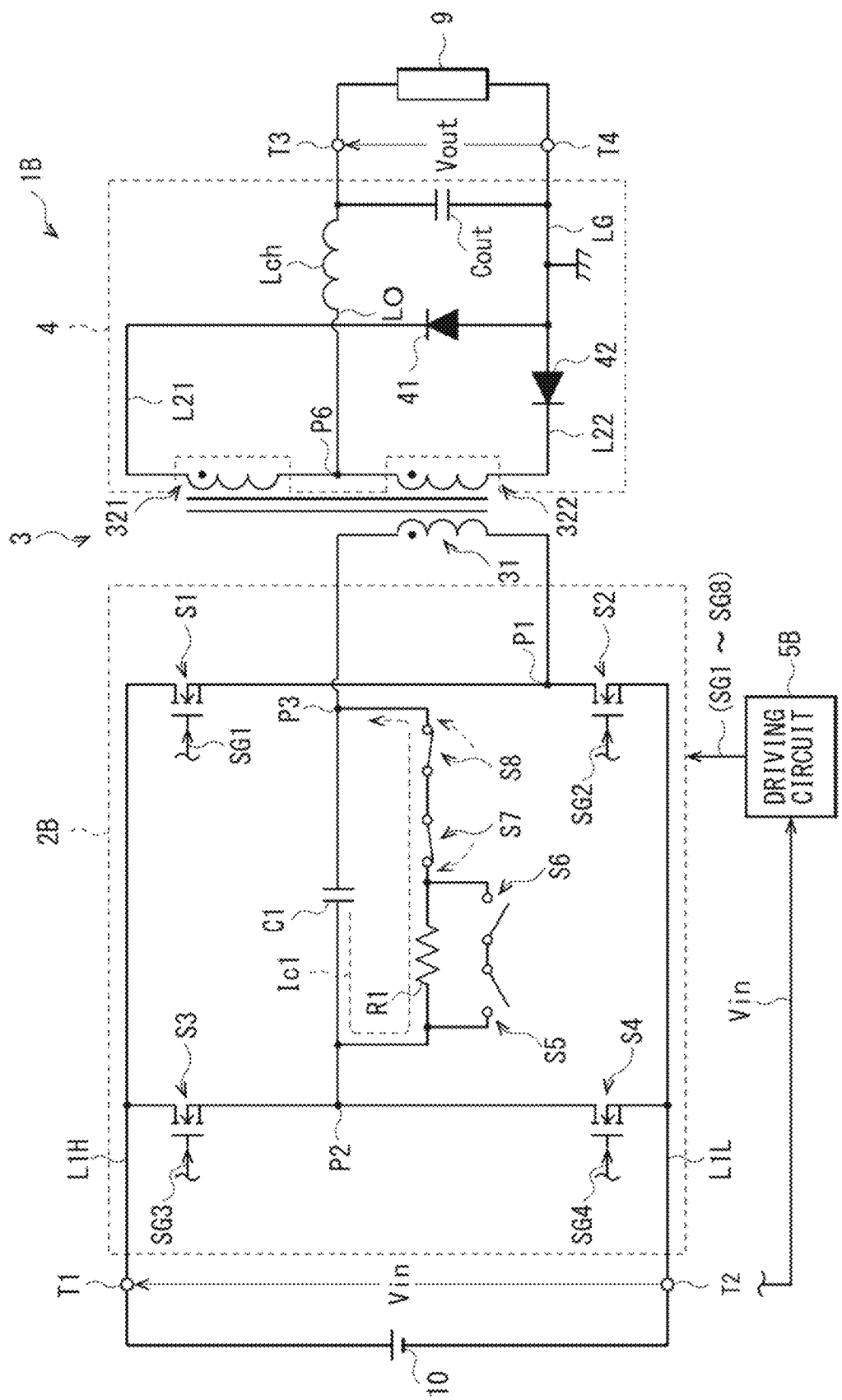
FIG. 11 is a circuit diagram schematically illustrating an operation example at the time of switching an operation state of an inverter circuit illustrated in FIG. 10.
Figure 12:
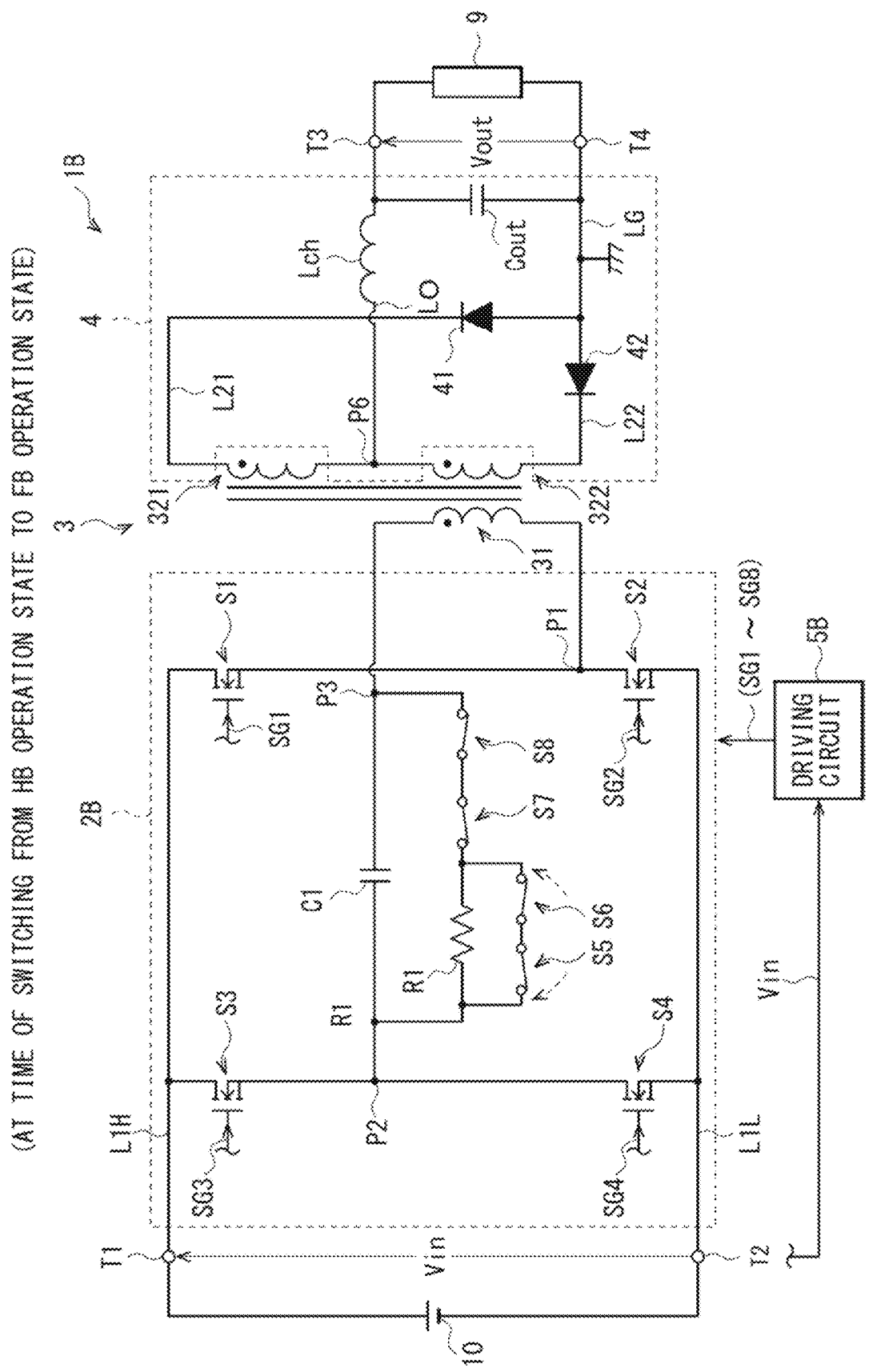
FIG. 12 is a circuit diagram schematically illustrating an operation example that follows FIG. 11.

Here, FIGS. 11 and 12 each schematically illustrate an operation example (an operation example of each of the switches S5 to S8, etc.) at the time of switching the operation state of the inverter circuit 2B in a circuit diagram.

In performing such switching from the half-bridge operation state to the full-bridge operation state, the driving circuit 5B first performs operation control on each of the switches S5 to S8 in a manner illustrated in FIG. 11, for example. That is, the driving circuit 5B switches each of the switches S7 and S8 from the OFF state to the ON state (see broken-line arrows in FIG. 11). Thus, also in Modification Example 2, the electric charge accumulated in the capacitor C1 is discharged via the resistor R1 and each of the switches S7 and S8 (see the discharge current Ic1 illustrated in FIG. 11) in a manner similar to that in Modification Example 1. Note that at this time, in Modification Example 2 also, the switches S5 and S6 each remain set to the OFF state as in the half-bridge operation state, similarly to Modification Example 1.

Next, as illustrated in FIG. 12, for example, after such electric charge accumulated in the capacitor C1 is discharged, the driving circuit 5B switches each of the switches S5 and S6 from the OFF state to the ON state (see broken-line arrows in FIG. 12). That is, in Modification Example 2, unlike in Modification Example 1, the operation state of the inverter circuit 2B is switched to the full-bridge operation state with each of the switches S7 and S8 remaining set to the ON state (without being returned to the OFF state). In this way, in Modification Example 2, the switches S7 and S8 each serve as a discharging switch, and also as a changeover switch similar to the switches S5 and S6.

(Workings and Effects)

Basically, the switching power supply apparatus 1B of Modification Example 2 having such a configuration is also able to provide effects similar to those of the switching power supply apparatus 1A of Modification Example 1, through similar workings.

Modification Example 3

(Configuration)

Figure 13:
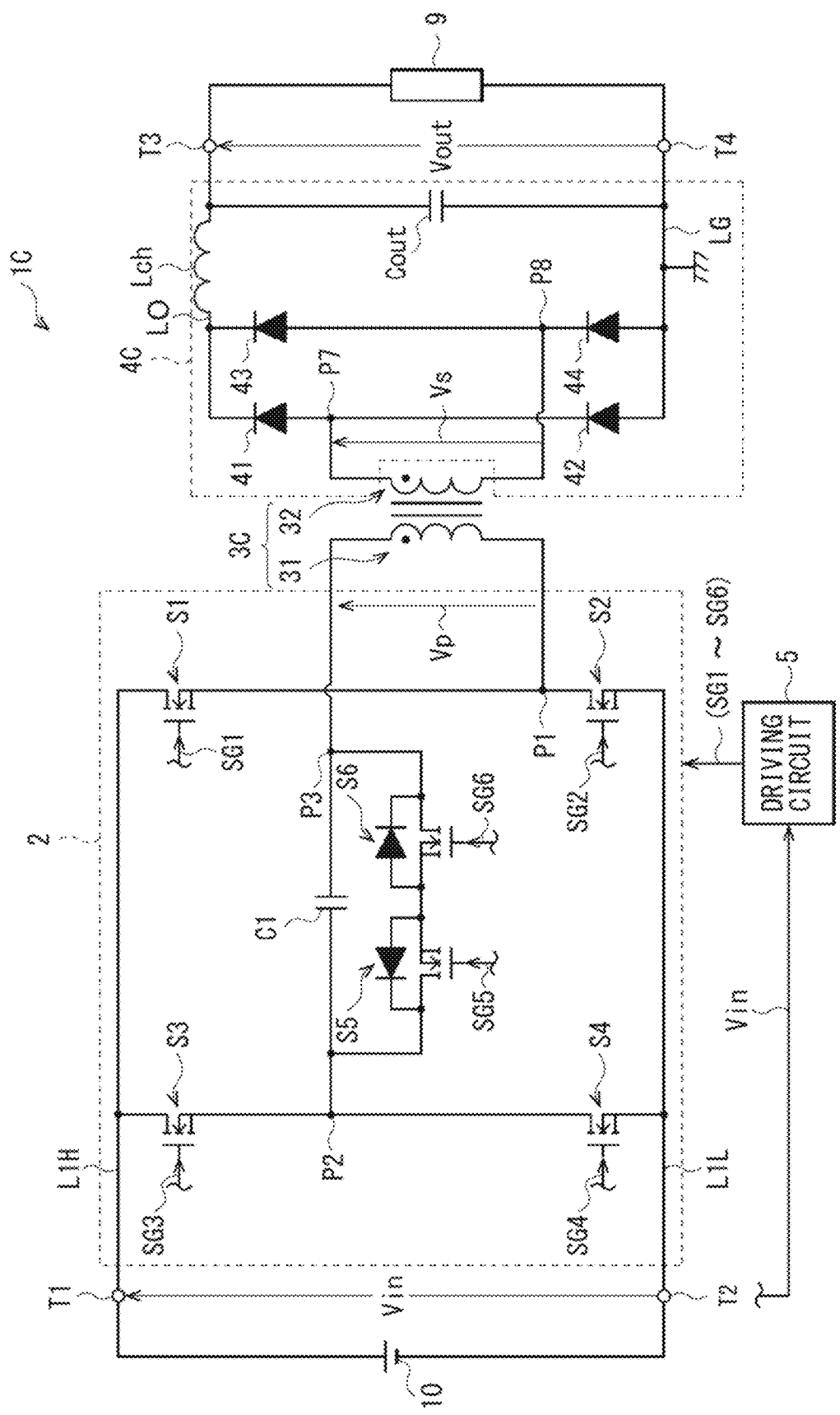
FIG. 13 is a circuit diagram illustrating a schematic configuration example of a switching power supply apparatus according to Modification Example 3.

FIG. 13 illustrates a schematic configuration example of a switching power supply apparatus (a switching power supply apparatus IC) according to Modification Example 3 in a circuit diagram.

Note that, as with the example embodiment, a system including the direct-current input power source 10 and the switching power supply apparatus 1C corresponds to a specific example of the "electric power supply system" in one embodiment of the disclosure.

The switching power supply apparatus 1C of Modification Example 3 corresponds to the switching power supply apparatus 1 of the example embodiment in which the transformer 3 and the rectifying and smoothing circuit 4 are replaced with a transformer 3C and a rectifying and smoothing circuit 4C, respectively, with the remainder of configuration being unchanged.

The transformer 3C includes the single primary winding 31 and a single secondary winding 32. That is, the transformer 3 is provided with the two secondary windings 321 and 322, whereas the transformer 3C is provided with the single secondary winding 32 only. The secondary winding 32 has a first end coupled to a node P7 in the rectifying and smoothing circuit 4C to be described later, and a second end coupled to a node P8 in the rectifying and smoothing circuit 4C.

Like the transformer 3, the transformer 3C also performs voltage conversion of a voltage generated by the inverter circuit 2, that is, the voltage Vp in the form of a rectangular pulse wave, and outputs an alternating-current voltage (the voltage Vs) from the end of the secondary winding 32. Note that the degree of the voltage conversion of the output voltage with respect to the input voltage in this case is determined by the turns ratio between the primary winding 31 and the secondary winding 32, and the duty ratio of the ON period of each of the switching devices S1 to S4 to the switching cycle described above.

The rectifying and smoothing circuit 4C includes four rectifying diodes 41 to 44, the single choke coil Lch, and the single output smoothing capacitor Cout. Specifically, the rectifying and smoothing circuit 4C includes a rectifying circuit including the rectifying diodes 41 to 44, and the smoothing circuit including the choke coil Lch and the output smoothing capacitor Cout. That is, the rectifying and smoothing circuit 4C corresponds to the rectifying and smoothing circuit 4 in which the configuration of the rectifying circuit is changed.

Note that such four rectifying diodes 41 to 44 correspond to a specific example of the "two or more rectifying devices" in one embodiment of the disclosure.

The rectifying circuit of Modification Example 3 includes what is called a "bridge" rectifying circuit, unlike the rectifying circuits of the example embodiment and Modification Examples 1 and 2, i.e., what is called the "center-tap" rectifying circuits. That is, the cathode of the rectifying diode 41 and a cathode of the rectifying diode 43 are each coupled to the output line LO via the choke coil Lch, and the anode of the rectifying diode 41 is coupled to the cathode of the rectifying diode 42 and the foregoing first end of the secondary winding 32 at the node P7. Further, the anode of the rectifying diode 42 and an anode of the rectifying diode 44 are each coupled to the ground line LG, and a cathode of the rectifying diode 44 is coupled to an anode of the rectifying diode 43 and the foregoing second end of the secondary winding 32 at the node P8.

In the rectifying and smoothing circuit 4C having such a configuration, the rectifying circuit including the rectifying diodes 41 to 44 rectifies the alternating-current voltage (the voltage Vs) outputted from the transformer 3C and outputs the rectified voltage, in a manner similar to that in the rectifying and smoothing circuit 4.

(Workings and Effects)

Basically, the switching power supply apparatus 1C of Modification Example 3 having such a configuration is also able to provide effects similar to those of the switching power supply apparatus 1 of the example embodiment, through similar workings.

Further, in Modification Example 3, in particular, the bridge rectifying circuit is employed as the rectifying circuit in the rectifying and smoothing circuit 4C. Accordingly, the number of the windings, or the number of the secondary windings, in the transformer 3C is reduced to one (the secondary winding 32), as compared with the example embodiment and Modification Examples 1 and 2 described above, for example. As a result, it is possible to achieve downsizing and a reduction in loss of the transformer 3C.

Note that in Modification Example 3 also, the inverter circuit 2A described in Modification Example 1 or the inverter circuit 2B described in Modification Example 2 may be provided in place of the inverter circuit 2.

Modification Examples 4 and 5

(Configuration)

Switching power supply apparatuses (switching power supply apparatuses 1D and 1E) according to Modification Examples 4 and 5 differ from the foregoing example embodiment and Modification Example 3 in that what is called a synchronous rectifying circuit is employed as the rectifying circuit in each of the rectifying and smoothing circuits 4 and 4C, as described below.

Figure 14:
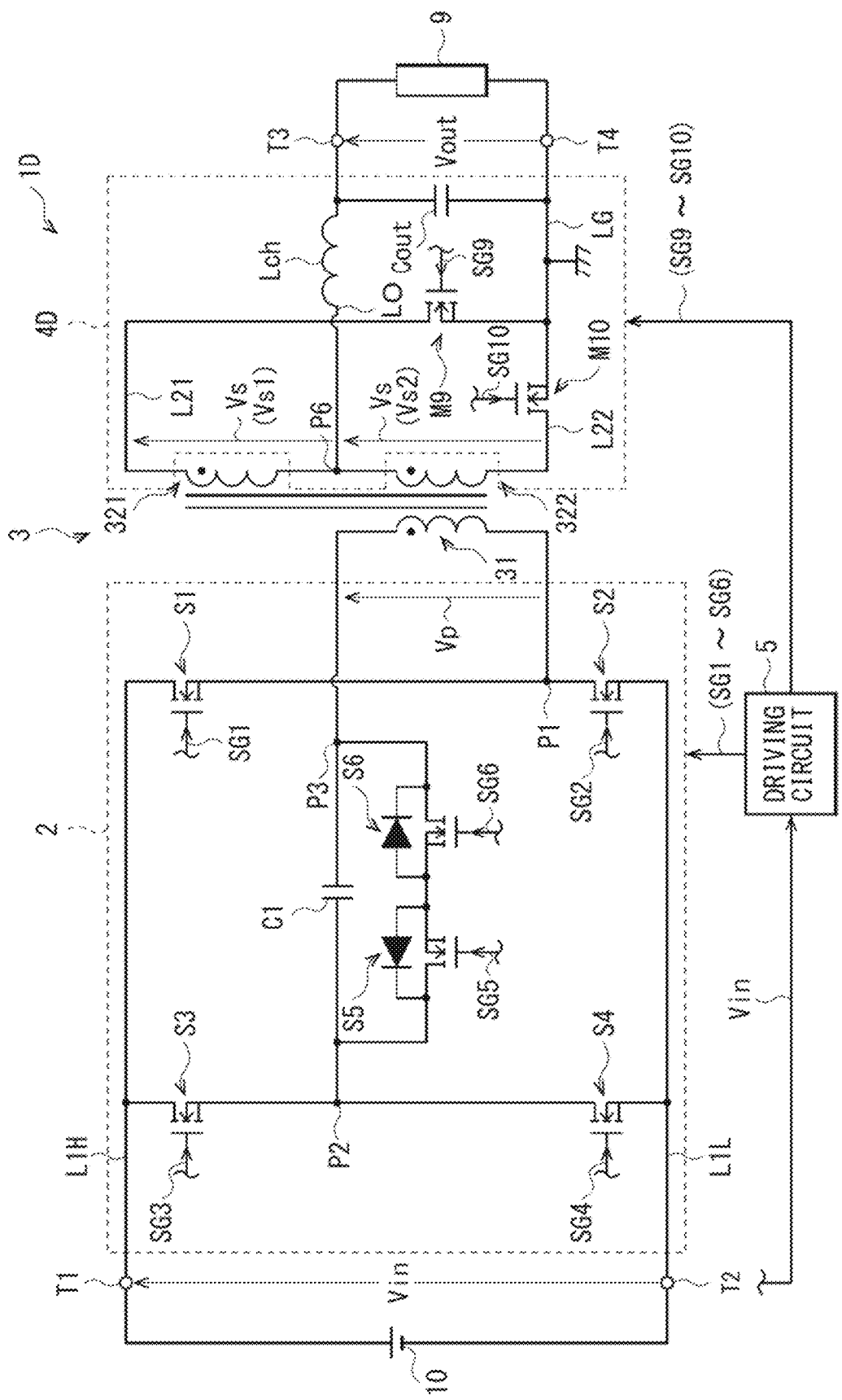
FIG. 14 is a circuit diagram illustrating a schematic configuration example of a switching power supply apparatus according to Modification Example 4.

Specifically, FIG. 14 illustrates a schematic configuration example of the switching power supply apparatus (the switching power supply apparatus 1D) according to Modification Example 4 in a circuit diagram.

The switching power supply apparatus 1D according to Modification Example 4 corresponds to the switching power supply apparatus 1 according to the example embodiment in which the rectifying and smoothing circuit 4 is replaced with a rectifying and smoothing circuit 4D, with the remainder of configuration being unchanged.

In the synchronous rectifying circuit (the rectifying and smoothing circuit 4D) of Modification Example 4, as illustrated in FIG. 14, the rectifying diodes 41 and 42 described in the example embodiment include respective MOS-FETs (MOS transistors M9 and M10) serving as switching devices. Further, in this synchronous rectifying circuit, the MOS transistors M9 and M10 are controlled to perform synchronous rectification, that is, controlled so that the MOS transistors M9 and M10 themselves come into an ON state in synchronization with periods during which respective parasitic diodes of the MOS transistors M9 and M10 are conducting. Specifically, the driving circuit 5 of Modification Example 4 controls ON and OFF operations of the MOS transistors M9 and M10 by using respective driving signals SG9 and SG10 (see FIG. 14).

Figure 15:
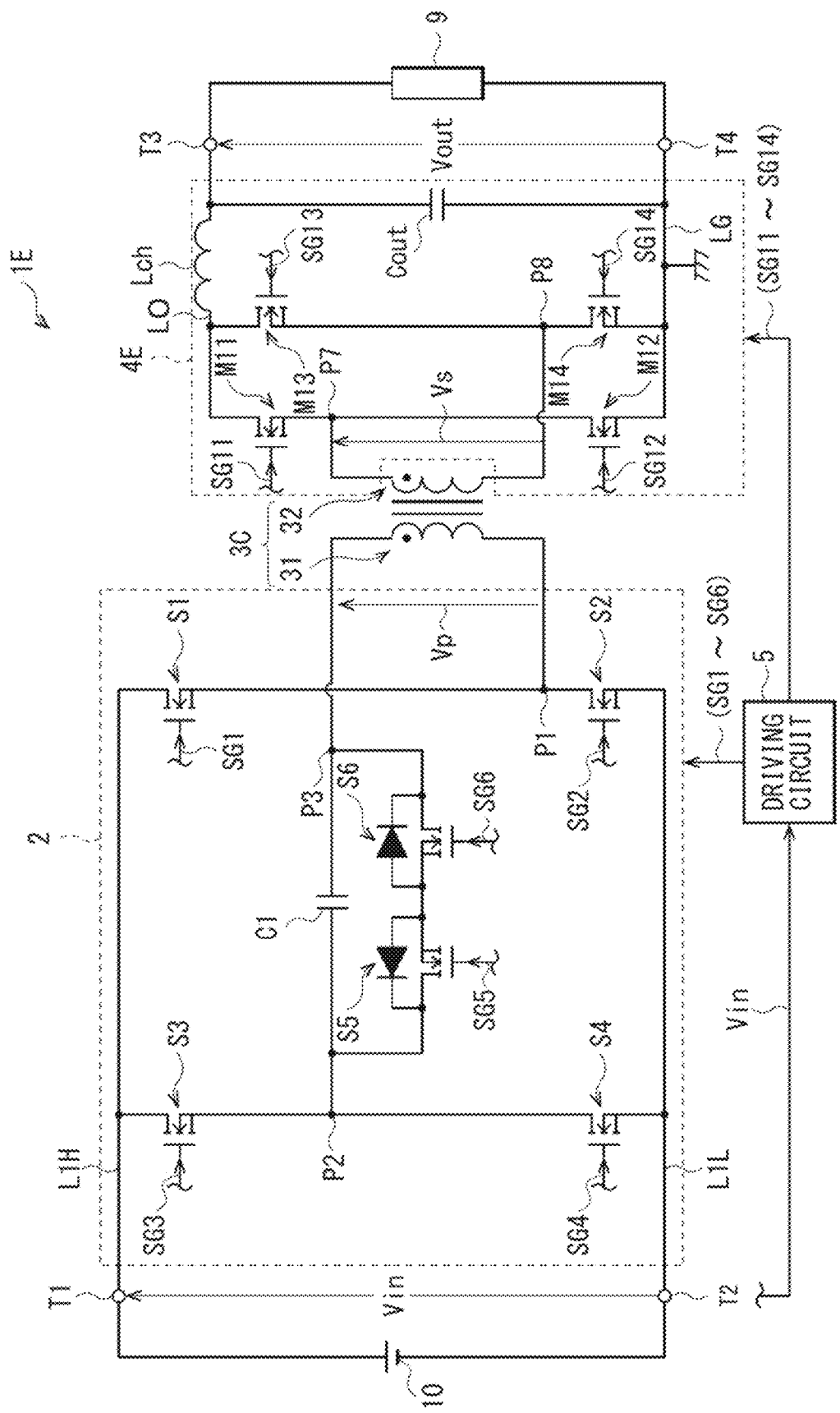
FIG. 15 is a circuit diagram illustrating a schematic configuration example of a switching power supply apparatus according to Modification Example 5.

Further, FIG. 15 illustrates a schematic configuration example of the switching power supply apparatus (the switching power supply apparatus 1E) according to Modification Example 5 in a circuit diagram.

The switching power supply apparatus 1E according to Modification Example 5 corresponds to the switching power supply apparatus 1C according to Modification Example 3 in which the rectifying and smoothing circuit 4C is replaced with a rectifying and smoothing circuit 4E, with the remainder of configuration being unchanged.

In the synchronous rectifying circuit (the rectifying and smoothing circuit 4E) of Modification Example 5, as illustrated in FIG. 15, the rectifying diodes 41 to 44 described in Modification Example 3 include respective MOS-FETs (MOS transistors M11 to M14) serving as switching devices. Further, in the synchronous rectifying circuit of Modification Example 5 also, as in the synchronous rectifying circuit of Modification Example 4 described above, the MOS transistors M11 to M14 are controlled to perform synchronous rectification, that is, controlled so that the MOS transistors M11 to M14 themselves come into an ON state in synchronization with periods during which the respective parasitic diodes of the MOS transistors M11 to M14 are conducting. Specifically, the driving circuit 5 of Modification Example 5 controls ON and OFF operations of the MOS transistors M11 to M14 by using respective driving signals SG11 to SG14 (see FIG. 15).

Note that, as with the example embodiment, a system including the direct-current input power source 10 and the switching power supply apparatus 1D or the switching power supply apparatus 1E corresponds to a specific example of the "electric power supply system" in one embodiment of the disclosure.

(Workings and Effects)

Basically, the switching power supply apparatuses 1D and 1E of Modification Examples 4 and 5 having such configurations are also able to provide effects similar to those of the switching power supply apparatuses 1 and IC of the example embodiment and Modification Example 3, respectively, through similar workings.

Further, in each of Modification Examples 4 and 5, in particular, the two or more rectifying devices in the rectifying circuit each include the switching device, and the rectifying circuit includes the synchronous rectifying circuit. Thus, a conduction loss occurring upon rectification is reduced by such a synchronous rectifying circuit. Accordingly, it is possible for the rectifying circuit to achieve downsizing and a reduction in loss. Examples of such a switching device include, in addition to the foregoing MOS-FET, a high electron mobility transistor (HEMT), i.e., a heterostructure field-effect transistor (HFET), and an IGBT with a diode added thereto in parallel or a bipolar transistor with a diode added thereto in parallel.

In Modification Examples 4 and 5 also, the inverter circuit 2A described in Modification Example 1 or the inverter circuit 2B described in Modification Example 2 may be provided in place of the inverter circuit 2.

3. Other Modification Examples

The disclosure has been described above with reference to the example embodiment and the modification examples. However, embodiments of the disclosure are not limited thereto, and may be modified in a variety of ways.

For example, although specific configurations of the inverter circuit have been described in the foregoing example embodiment, etc., the configurations described in the foregoing example embodiment, etc. are non-limiting examples, and any other configuration may be employed for the inverter circuit, for example. Specifically, for example, regarding how the capacitor C1 and the primary winding 31 coupled in series to each other are arranged with respect to each other, the arrangement relationship described in the example embodiment, etc. is non-limiting. Thus, the capacitor C1 and the primary winding 31 may be arranged in no particular order with respect to each other. Further, although the case where the switches S5 to S8, that is, the changeover switches and the discharging switches, include the foregoing bidirectional switches has been described in the foregoing example embodiment, etc. by way of example, this is non-limiting. That is, these changeover switches and discharging switches may include any other switch devices such as relays or triacs.

Further, although specific configurations of the transformer (the primary winding and the secondary winding) have been described in the foregoing example embodiment, etc., the configurations described in the foregoing example embodiment, etc. are non-limiting examples, and any other configuration may be employed for the transformer (the primary winding and the secondary winding), for example.

Furthermore, although specific configurations of the rectifying and smoothing circuit (the rectifying circuit and the smoothing circuit) have been described in the foregoing example embodiment, etc., the configurations described in the foregoing example embodiment, etc. are non-limiting examples, and any other configuration may be employed for the rectifying and smoothing circuit (the rectifying circuit and the smoothing circuit), for example. Specifically, although an example case where the choke coil Lch is disposed on the output line LO has been described in the foregoing example embodiment, etc., this is non-limiting. For example, the choke coil Lch may be disposed on the ground line LG.

In addition, although the description has been given of the specific techniques by which the driving circuit performs operation control (switching driving) on each of the switching devices in the foregoing example embodiment, etc., the techniques described in the foregoing example embodiment, etc. are non-limiting examples, and any other technique may be employed for the switching driving. Further, for example, as a technique to switch between the operation states (the half-bridge operation state and the full-bridge operation state) of the inverter circuit in accordance with the magnitude of the input voltage (a switching technique using a changeover switch), the technique described in each of the foregoing example embodiment, etc., is non-limiting, and any other technique may be employed.

Further, although the DC-DC converter has been described in the foregoing example embodiment, etc. as an example of the switching power supply apparatus according to the disclosure, any embodiment of the disclosure is applicable to any other kind of switching power supply apparatus, such as an AC-DC converter.

Moreover, any two or more of the configuration examples and other examples described so far may be combined and applied in a desired manner.

Embodiments of the disclosure may be configured as follows.

(1)
A switching power supply apparatus including:
a pair of input terminals configured to receive an input voltage;
a pair of output terminals configured to output an output voltage;
a transformer including a primary winding and a secondary winding;
an inverter circuit disposed between the pair of input terminals and the primary winding, and including first to fourth switching devices, a first capacitor, and a changeover switch;
a rectifying and smoothing circuit disposed between the pair of output terminals and the secondary winding, and including a rectifying circuit and a smoothing circuit, the rectifying circuit including two or more rectifying devices, the smoothing circuit including an inductor and a second capacitor; and
a driver configured to perform switching driving to control respective operations of the first to fourth switching devices of the inverter circuit and configured to control an operation of the changeover switch, in which
the first and the second switching devices are coupled in series to each other between a pair of coupling lines, each of the coupling lines being coupled to corresponding one of the pair of input terminals,
the third and the fourth switching devices are coupled in series to each other between the pair of coupling lines,
the first capacitor and the primary winding are coupled in series to each other in no particular order between a first node and a second node, the first node being a node between the first and second switching devices, the second node being a node between the third and the fourth switching devices, and
the changeover switch is coupled in parallel to the first capacitor.

(2)
The switching power supply apparatus according to (1), in which
the driver is configured to:
perform, in a case where the input voltage is greater than or equal to a predetermined threshold voltage, the switching driving to cause the inverter circuit to perform a half-bridge operation, by setting the changeover switch to an OFF state, and
perform, in a case where the input voltage is less than the predetermined threshold voltage, the switching driving to cause the inverter circuit to perform a full-bridge operation, by setting the changeover switch to an ON state.

(3)
The switching power supply apparatus according to (1) or (2), in which
the inverter circuit further includes a discharging resistor and a discharging switch, and
the discharging resistor and the discharging switch coupled in series to each other are each coupled in parallel to the first capacitor.

(4)
The switching power supply apparatus according to (3), in which the driver is configured to, in performing switching of an operation state of the inverter circuit from a half-bridge operation state where the changeover switch is set to an OFF state to a full-bridge operation state where the changeover switch is set to an ON state, switch the changeover switch from the OFF state to the ON state after causing electric charge accumulated in the first capacitor to be discharged via the discharging resistor by setting the discharging switch to an ON state.

(5)
The switching power supply apparatus according to any one of (1) to (4), in which the changeover switch includes a bidirectional switch including a pair of metal-oxide-semiconductor field-effect transistors, the metal-oxide-semiconductor field-effect transistors being coupled in series to each other in orientations opposite to each other.

(6)
The switching power supply apparatus according to any one of (1) to (5), in which the first to fourth switching devices each include a metal-oxide-semiconductor field-effect transistor.

(7)
The switching power supply apparatus according to any one of (1) to (6), in which the rectifying circuit includes a center-tap rectifying circuit.

(8)
The switching power supply apparatus according to any one of (1) to (6), in which the rectifying circuit includes a bridge rectifying circuit.

(9)
The switching power supply apparatus according to any one of (1) to (8), in which the two or more rectifying devices each include a switching device, and the rectifying circuit includes a synchronous rectifying circuit.

(10)
An electric power supply system including:
the switching power supply apparatus according to any one of (1) to (9); and
a power source configured to supply the input voltage to the pair of input terminals.

The switching power supply apparatus according to at least one embodiment of the disclosure and the electric power supply system according to at least one example embodiment of the disclosure each make it possible to achieve a reduction in loss while achieving downsizing.

The invention claimed is:
1. A switching power supply apparatus comprising:
a pair of input terminals configured to receive an input voltage;
a pair of output terminals configured to output an output voltage;
a transformer including a primary winding and a secondary winding;
an inverter circuit disposed between the pair of input terminals and the primary winding, and including first to fourth switching devices, a first capacitor, and a changeover switch;

a rectifying and smoothing circuit disposed between the pair of output terminals and the secondary winding, and including a rectifying circuit and a smoothing circuit, the rectifying circuit including two or more rectifying devices, the smoothing circuit including an inductor and a second capacitor; and a driver configured to perform switching driving to control respective operations of the first to fourth switching devices of the inverter circuit and configured to control an operation of the changeover switch, wherein the first and the second switching devices are coupled in series to each other between a pair of coupling lines, each of the coupling lines being coupled to corresponding one of the pair of input terminals, the third and the fourth switching devices are coupled in series to each other between the pair of coupling lines, the first capacitor and the primary winding are coupled in series to each other in no particular order between a first node and a second node, the first node being a node between the first and second switching devices, the second node being a node between the third and the fourth switching devices, and the changeover switch is coupled in parallel to the first capacitor, wherein the driver is configured to:

perform, in a case where the input voltage is greater than or equal to a predetermined threshold voltage, the switching driving to cause the inverter circuit to perform a half-bridge operation, by setting the changeover switch to an OFF state, and perform, in a case where the input voltage is less than the predetermined threshold voltage, the switching driving to cause the inverter circuit to perform a full-bridge operation, by setting the changeover switch to an ON state.

2. The switching power supply apparatus according to claim 1, wherein the inverter circuit further includes a discharging resistor and a discharging switch, and the discharging resistor and the discharging switch coupled in series to each other are each coupled in parallel to the first capacitor.

3. The switching power supply apparatus according to claim 2, wherein the driver is configured to, in performing switching of an operation state of the inverter circuit from a half-bridge operation state where the changeover switch is set to an OFF state to a full-bridge operation state where the changeover switch is set to an ON state, switch the changeover switch from the OFF state to the ON state after causing electric charge accumulated in the first capacitor to be discharged via the discharging resistor by setting the discharging switch to an ON state.

4. The switching power supply apparatus according to claim 1, wherein the changeover switch includes a bidirectional switch including a pair of metal-oxide-semiconductor field-effect transistors, the metal-oxide-semiconductor field-effect transistors being coupled in series to each other in orientations opposite to each other.

5. The switching power supply apparatus according to claim 1, wherein the first to fourth switching devices each include a metal-oxide-semiconductor field-effect transistor.

6. The switching power supply apparatus according to claim 1, wherein the rectifying circuit comprises a center-tap rectifying circuit.

7. The switching power supply apparatus according to claim 1, wherein the rectifying circuit comprises a bridge rectifying circuit.

8. The switching power supply apparatus according to claim 1, wherein the two or more rectifying devices each include a switching device, and the rectifying circuit comprises a synchronous rectifying circuit.

9. An electric power supply system comprising:

the switching power supply apparatus according to claim 1; and a power source configured to supply the input voltage to the pair of input terminals.

* * * * *